(12) United States Patent
Pan et al.

(10) Patent No.: US 11,601,997 B1
(45) Date of Patent: Mar. 7, 2023

(54) METHOD AND APPARATUS FOR A REMOTE USER EQUIPMENT (UE) TO SUPPORT DIRECT TO INDIRECT COMMUNICATION PATH SWITCHING IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/871,390

(22) Filed: Jul. 22, 2022

Related U.S. Application Data

(60) Provisional application No. 63/236,895, filed on Aug. 25, 2021.

(51) Int. Cl.
*H04W 76/14* (2018.01)
*H04W 24/10* (2009.01)
(Continued)

(52) U.S. Cl.
CPC .......... *H04W 76/14* (2018.02); *H04W 24/10* (2013.01); *H04W 88/04* (2013.01); *H04W 92/18* (2013.01)

(58) Field of Classification Search
CPC ...... H04L 43/06; H04W 8/005; H04W 16/26; H04W 24/02; H04W 24/10; H04W 36/00; H04W 36/0083; H04W 36/0088; H04W 40/24; H04W 52/365; H04W 72/08; H04W 76/14; H04W 76/19; H04W 76/23;
(Continued)

(56) References Cited

U.S. PATENT DOCUMENTS

| 11,277,880 B2* | 3/2022 | Lee | ................. H04W 76/19 |
| 2018/0152986 A1* | 5/2018 | Jung | ................. H04W 48/20 |

(Continued)

FOREIGN PATENT DOCUMENTS

| EP | 3562182 | 10/2019 | |
| EP | 3562182 B1 * | 9/2020 | ........ H04W 36/0016 |

(Continued)

OTHER PUBLICATIONS

European Search Report in corresponding EP Application No. 22186371.5, dated Dec. 8, 2022.

(Continued)

*Primary Examiner* — Thomas R Cairns
(74) *Attorney, Agent, or Firm* — Blue Capital Law Firm, P.C.

(57) ABSTRACT

A method and device are disclosed from the perspective of a remote UE. In one embodiment, the remote UE establishes a Radio Resource Control (RRC) connection with a network node. The remote UE also transmits a Layer 2 Identity (L2ID) of the remote UE to the network node. The remote UE further receives a first RRC Reconfiguration message from the network node for path switching from direct to indirect communication, wherein the first RRC Reconfiguration message indicates a relay UE for the path switching. In addition, the remote UE establishes a PC5 connection with the relay UE. Furthermore, the remote UE transmits a first RRC Reconfiguration Complete message corresponding to the first RRC Reconfiguration message to the network node via the relay UE.

15 Claims, 25 Drawing Sheets

(51) Int. Cl.
*H04W 88/04* (2009.01)
*H04W 92/18* (2009.01)

(58) Field of Classification Search
CPC ... H04W 76/25; H04W 76/27; H04W 84/047; H04W 84/18; H04W 88/04; H04W 92/18; H04B 7/15
See application file for complete search history.

(56) References Cited

U.S. PATENT DOCUMENTS

| | | | |
|---|---|---|---|
| 2019/0159018 A1* | 5/2019 | Basu Mallick | H04W 8/005 |
| 2019/0215762 A1* | 7/2019 | Kim | H04W 88/02 |
| 2021/0289580 A1* | 9/2021 | Damnjanovic | H04W 76/14 |
| 2022/0046485 A1* | 2/2022 | Hong | H04W 36/00837 |

FOREIGN PATENT DOCUMENTS

| | | | |
|---|---|---|---|
| WO | WO-2021192918 A1 * | 9/2021 | |
| WO | WO-2022081730 A1 * | 4/2022 | |

OTHER PUBLICATIONS

Vivo, "Remaining issues on service continuity in L2 relaying", R2-2107452, Agenda Item: 8.7.2.2, 3GPP TSG-RAN WG Meeting #115 electronic E-Meeting, Aug. 16-27, 2021.
ZTE, "Discussion on connection establishment and bearer setup", R2-168149, Agenda Item: 8.4.2.2, 3GPP TSG-RAN WG2 Meeting #96, Reno, USA, Nov. 14-18, 2016.

* cited by examiner

US 11,601,997 B1

METHOD AND APPARATUS FOR A REMOTE USER EQUIPMENT (UE) TO SUPPORT DIRECT TO INDIRECT COMMUNICATION PATH SWITCHING IN A WIRELESS COMMUNICATION SYSTEM

CROSS-REFERENCE TO RELATED APPLICATIONS

The present Application claims the benefit of U.S. Provisional Patent Application Ser. No. 63/236,895 filed on Aug. 25, 2021, the entire disclosure of which is incorporated herein in its entirety by reference.

FIELD

This disclosure generally relates to wireless communication networks, and more particularly, to a method and apparatus for a remote UE to support direct to indirect communication path switching in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a remote UE. In one embodiment, the remote UE establishes a Radio Resource Control (RRC) connection with a network node. The remote UE also transmits a Layer 2 Identity (L2ID) of the remote UE to the network node. The remote UE further receives a first RRC Reconfiguration message from the network node for path switching from direct to indirect communication, wherein the first RRC Reconfiguration message indicates a relay UE for the path switching. In addition, the remote UE establishes a PC5 connection with the relay UE. Furthermore, the remote UE transmits a first RRC Reconfiguration Complete message corresponding to the first RRC Reconfiguration message to the network node via the relay UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.287 V16.2.0, "Architecture enhancements for 5G System (5GS) to support Vehicle-to-Everything (V2X) services (Release 16)"; TR 23.752 V1.0.0, "Study on system enhancement for Proximity based services (ProSe) in the 5G System (5GS) (Release 17)"; TR 38.836 V17.0.0, "Study on NR sidelink relay (Release 17)"; and TS 38.331 V16.4.1, "NR; Radio Resource Control (RRC) protocol specification (Release 17)". The standards and documents listed above are hereby expressly incorporated by reference in their entirety.

Figure 1:
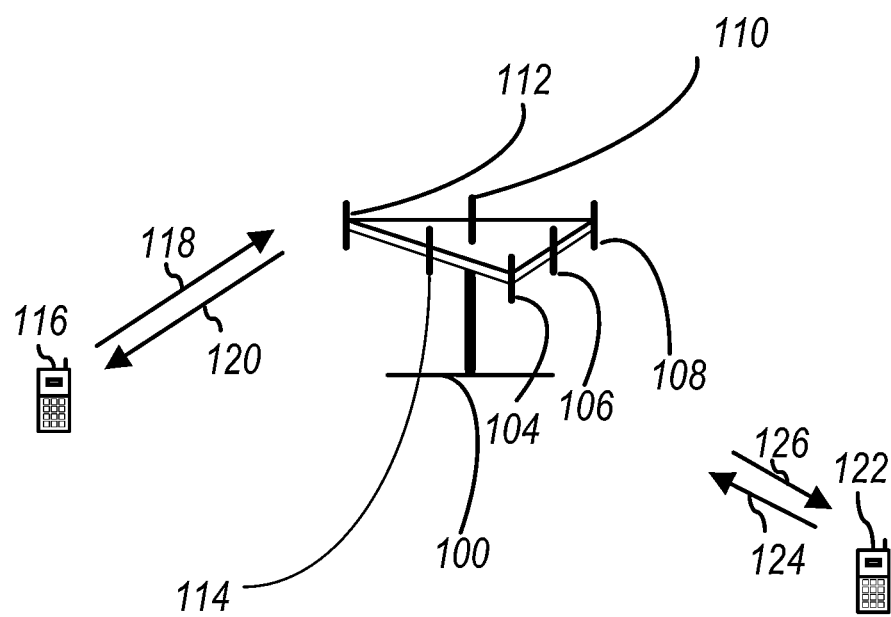
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
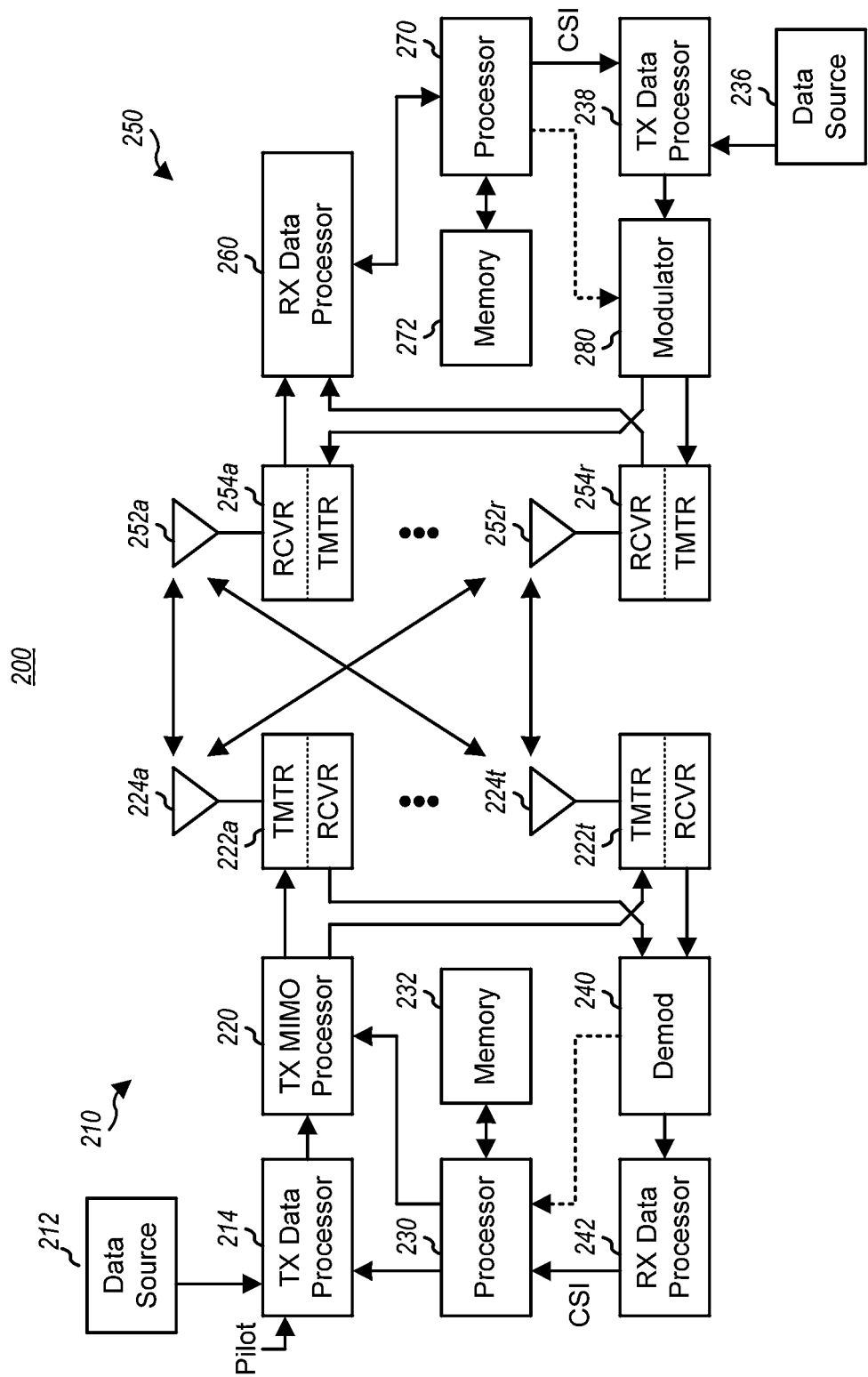
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
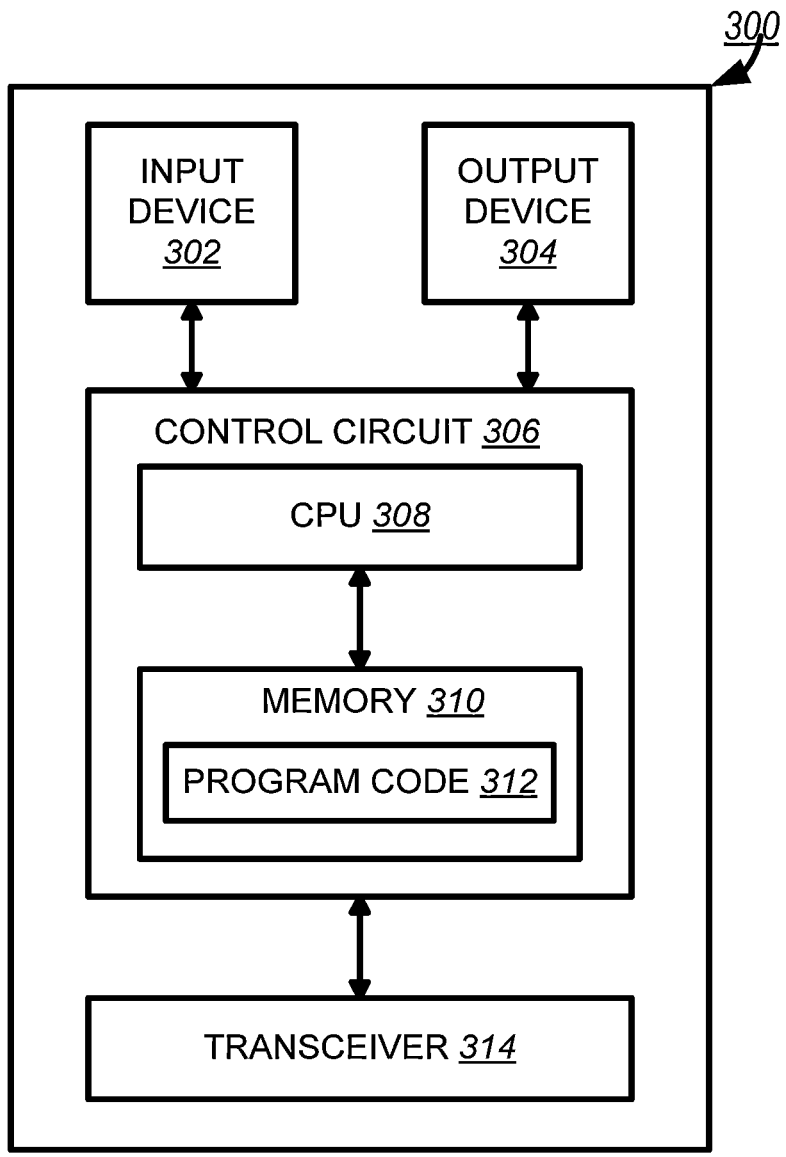
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
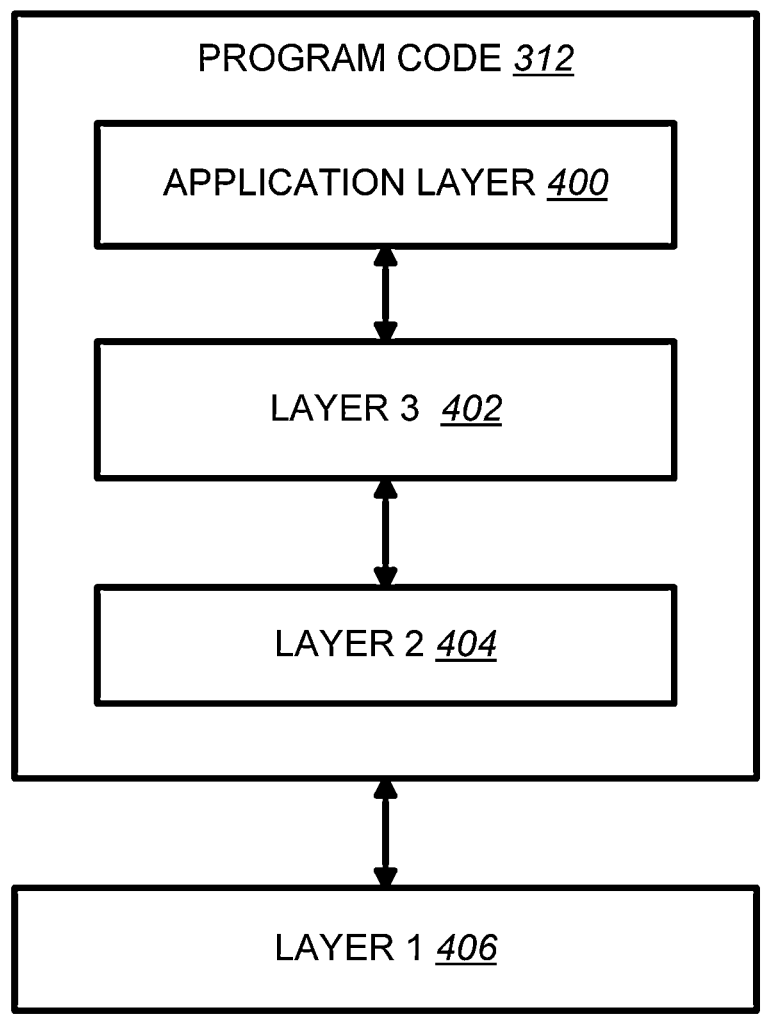
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.287 specifies Policy/Parameter provisioning, identifiers for unicast mode V2X communication, and Layer-2 link establishment over PC5 reference point as follows:

5.1.2.1 Policy/Parameter Provisioning
The following sets of information for V2X communications over PC5 reference point is provisioned to the UE:
[ . . . ]
    6) Policy/parameters when NR PC5 is selected:
      The mapping of V2X service types (e.g. PSIDs or ITS-AIDS) to V2X frequencies with Geographical Area(s).
      The mapping of Destination Layer-2 ID(s) and the V2X service types, e.g. PSIDs or ITS-AIDs of the V2X application for broadcast.
      The mapping of Destination Layer-2 ID(s) and the V2X service types, e.g. PSIDs or ITS-AIDs of the V2X application for groupcast.
      The mapping of default Destination Layer-2 ID(s) for initial signalling to establish unicast connection and the V2X service types, e.g. PSIDs or ITS-AIDS of the V2X application.
      NOTE 3: The same default Destination Layer-2 ID for unicast initial signalling can be mapped to more than one V2X service types. In the case where different V2X services are mapped to distinct default Destination Layer-2 IDs, when the UE intends to establish a single unicast link that can be used for more than one V2X service types, the UE can select any of the default Destination Layer-2 IDs to use for the initial signalling.
    PC5 QoS mapping configuration:
      Input from V2X application layer:
        V2X service type (e.g. PSID or ITS-AID).
        (Optional) V2X Application Requirements for the V2X service type, e.g. priority requirement, reliability requirement, delay requirement, range requirement.
      NOTE 4: Details of V2X Application Requirements for the V2X service type is up to implementation and out of scope of this specification.
    Output:
      PC5 QoS parameters defined in clause 5.4.2 (i.e. PQI and conditionally other parameters such as MFBR/GFBR, etc.).
    AS layer configurations (see TS 38.331 [15]), e.g. the mapping of PC5 QoS profile(s) to radio bearer(s), when the UE is "not served by E-UTRA" and "not served by NR".
      The PC5 QoS profile contains PC5 QoS parameters described in clause 5.4.2, and value for the QoS characteristics regarding Priority Level, Averaging Window, Maximum Data Burst Volume if default value is not used as defined in Table 5.4.4-1.
[ . . . ]
5.6.1.4 Identifiers for Unicast Mode V2X Communication Over PC5 Reference Point
For unicast mode of V2X communication over PC5 reference point, the destination Layer-2 ID used depends on the communication peer. The Layer-2 ID of the communication peer, identified by the Application Layer ID, may be discovered during the establishment of the PC5 unicast link, or known to the UE via prior V2X communications, e.g. existing or prior unicast link to the same Application Layer ID, or obtained from application layer service announcements. The initial signalling for the establishment of the PC5 unicast link may use the known Layer-2 ID of the communication peer, or a default destination Layer-2 ID associated with the V2X service type (e.g. PSID/ITS-AID) configured for PC5 unicast link establishment, as specified in clause 5.1.2.1. During the PC5 unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs. Based on privacy configuration as specified in clause 5.1.2.1, the update of the new identifiers of a source UE to the peer UE for the established unicast link may cause the peer UE to change its Layer-2 ID and optionally IP address/prefix if IP communication is used as defined in clause 6.3.3.2.

Figure 6:
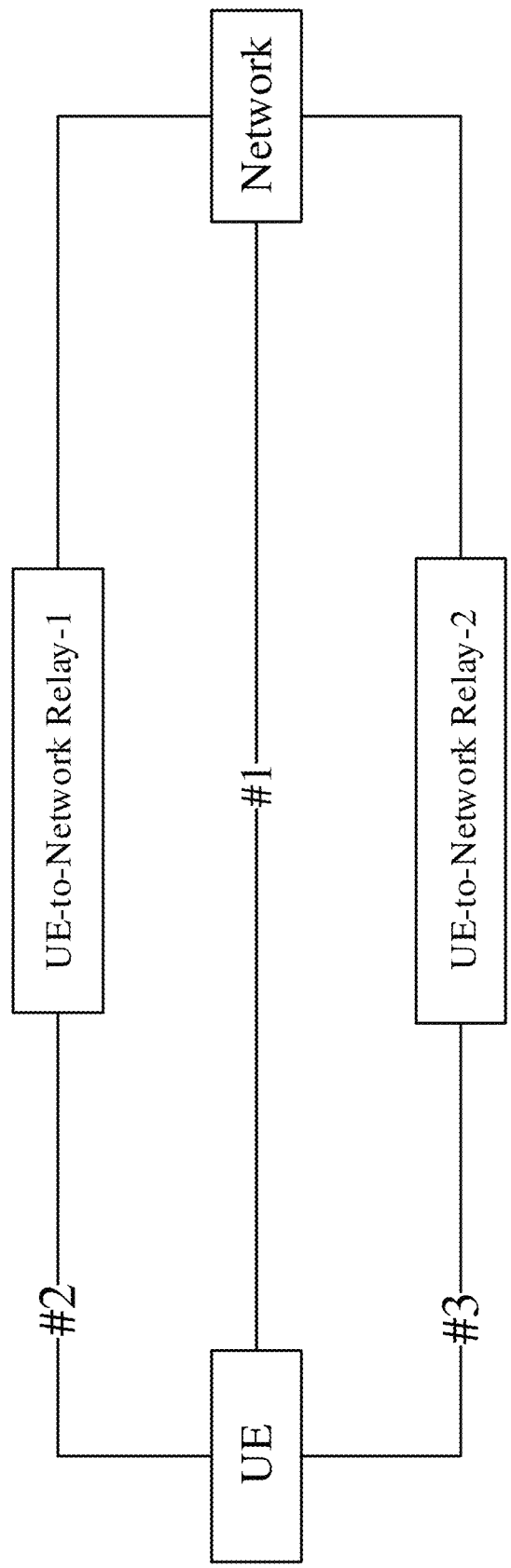
FIG. 6 is a reproduction of Figure 5.3.1-1 of 3GPP TR 23.752 V1.0.0.

A UE may establish multiple PC5 unicast links with a peer UE and use the same or different source Layer-2 IDs for these PC5 unicast links.
[ . . . ]
6.3.3.1 Layer-2 Link Establishment Over PC5 Reference Point
To perform unicast mode of V2X communication over PC5 reference point, the UE is configured with the related information as described in clause 5.1.2.1.
Figure 6.3.3.1-1 shows the layer-2 link establishment procedure for unicast mode of V2X communication over PC5 reference point.

Figure 5:
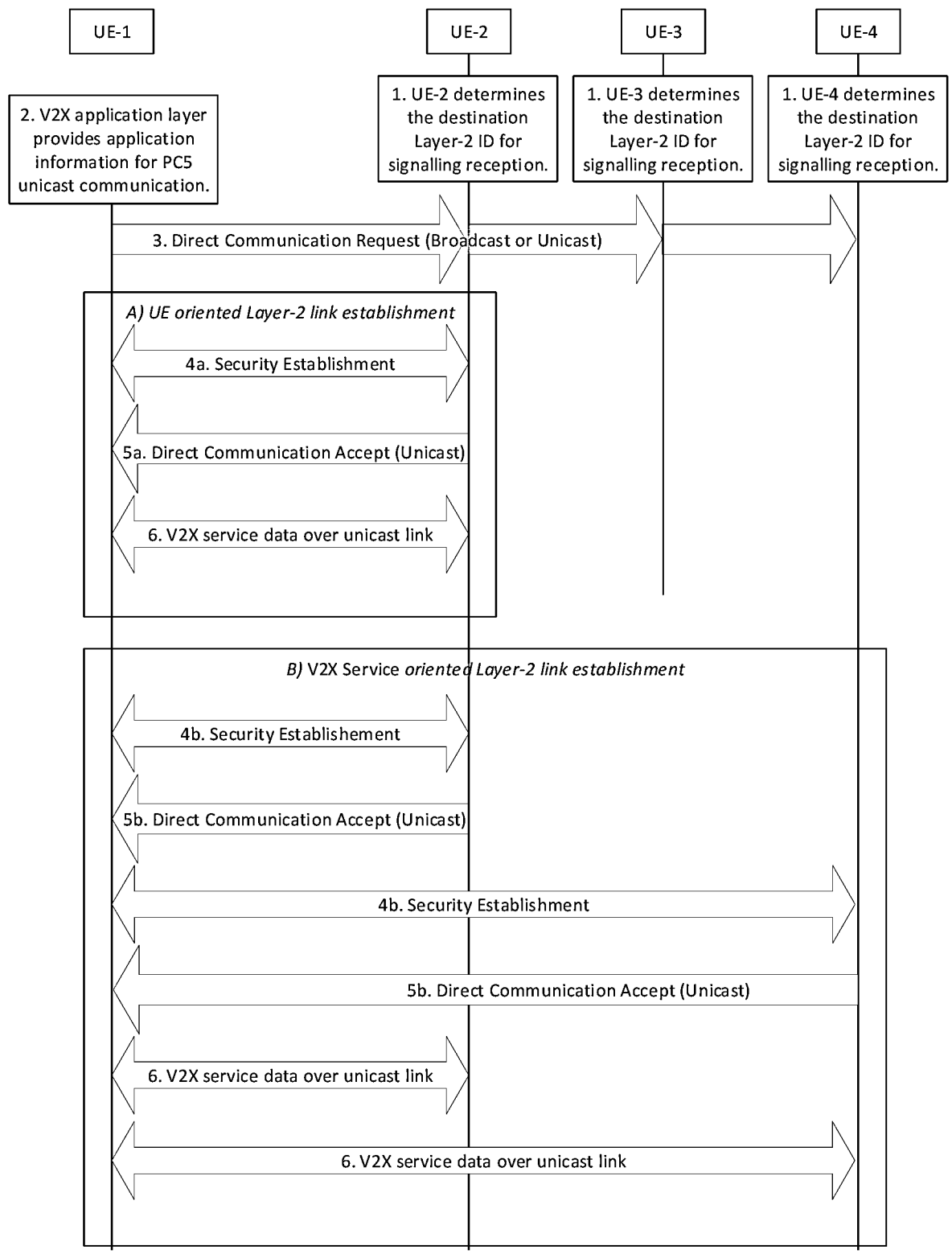
FIG. 5 is a reproduction of Figure 6.3.3.1-1 of 3GPP TS 23.287 V16.2.0.

[Figure 6.3.3.1-1 of 3GPP TS 23.287 V16.2.0, Entitled "Layer-2 Link Establishment Procedure", is Reproduced as FIG. 5]

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the V2X service type(s) (e.g. PSID(s) or ITS-AID(s)) of the V2X application and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.

3. UE-1 sends a Direct Communication Request message to initiate the unicast layer-2 link establishment procedure. The Direct Communication Request message includes:

Source User Info: the initiating UE's Application Layer ID (i.e. UE-Vs Application Layer ID).

If the V2X application layer provided the target UE's Application Layer ID in step 2, the following information is included:

Target User Info: the target UE's Application Layer ID (i.e. UE-2's Application Layer ID).

V2X Service Info: the information about V2X Service(s) requesting Layer-2 link establishment (e.g. PSID(s) or ITS-AID(s)).

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced V2X Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:
   IP Address Configuration: For IP communication, IP address configuration is required for this link and indicates one of the following values:
   "IPv6 Router" if IPv6 address allocation mechanism is supported by the initiating UE, i.e., acting as an IPv6 Router; or
   "IPv6 address allocation not supported" if IPv6 address allocation mechanism is not supported by the initiating UE.

Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.).

The source Layer-2 ID used for the security establishment procedure is determined as specified in clauses 5.6.1.1 and 5.6.1.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in Figure 6.3.3.1-1).

The Direct Communication Accept message includes:
   Source User Info: Application Layer ID of the UE sending the Direct Communication Accept message.
   QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc).

If IP communication is used:
   IP Address Configuration: For IP communication, IP address configuration is required for this link and indicates one of the following values:
   "IPv6 Router" if IPv6 address allocation mechanism is supported by the target UE, i.e., acting as an IPv6 Router; or
   "IPv6 address allocation not supported" if IPv6 address allocation mechanism is not supported by the target UE.

Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862 [21].

NOTE 3: When either the initiating UE or the target UE indicates the support of IPv6 router, corresponding address configuration procedure would be carried out after the establishment of the layer 2 link, and the link-local IPv6 addresses are ignored.

The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. V2X service data is transmitted over the established unicast link as below:

The PC5 Link Identifier, and PFI are provided to the AS layer, together with the V2X service data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer.

UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the V2X service data to UE-1 over the unicast link with UE-1.

3GPP TR 23.752 proposes to support UE-to-Network Relay for the following release (i.e. Release 17) as shown below. Layer-2 and Layer-3 based UE-to-Network Relay solutions are described in 3GPP TR 38.836.

5.3 Key Issue #3: Support of UE-to-Network Relay
5.3.1 General description
According to TS 22.261 [3] and TS 22.278 [2], support for UE-to-Network Relay needs to be studied. In addition, the Rel-16 5G architectural design (e.g. flow-based QoS communication over PC5/Uu interface) shall be taken into consideration as well.

The case that UE may be able to access to network via the direct network communication or the indirect network communication illustrated in Figure 5.3.1-1 needs to be considered, where path #1 is direct network communication path that may not exist, as well as path #2 and path #3 are indirect network communication paths via different UE-to-Network Relays.

[Figure 5.3.1-1 of 3GPP TR 23.752 V1.0.0, entitled "Example scenario of direct or indirect network communication path between UE and Network", is reproduced as FIG. 6]

Therefore, 5G ProSe needs to support UE-to-Network Relay. In particular, the following aspects need to be studied:

How to authorize a UE to be a 5G UE-to-Network Relay and how to authorize a UE to access 5GC via a 5G UE-to-Network Relay.

How to establish a connection between Remote UE and a UE-to-Network Relay to support connectivity to the network for the Remote UE.

How to support end-to-end requirements between Remote UE and the network via a UE-to-Network Relay, including QoS (such as data rate, reliability, latency) and the handling of PDU Session related attributes (e.g. S-NSSAI, DNN, PDU Session Type and SSC mode).

How the network allows and controls the QoS requirement for 5G ProSe UE-to-NW relay.

How to transfer data between the Remote UE and the network over the UE-to-Network Relay.

NOTE 1: Security and privacy aspects will be handled by SA WG3.

How to (re)select a UE-to-Network Relay for communication path selection between two indirect network communication paths (i.e. path #2 and path #3 in Figure 5.3.1-1).

How to perform communication path selection between a direct network communication path (i.e. path #1 in Figure 5.3.1-1) and an indirect network communication path (i.e. path #2 or path #3 in Figure 5.3.1-1).

How to guarantee service continuity during these communication path switch procedures for switching between a direct network communication path and an indirect communication path, as well as for switching between two indirect network communication paths.

NOTE 2: Support of non-unicast mode communication (i.e. one-to-many communication/broadcast or multicast) between network and UE-to-Network Relay UE and between UE-to-Network Relay and Remote UE(s) depends on the result of FS_5MBS work.

Two cases can be considered regarding support of UE-to-Network Relay, i.e. UE-to-Network Relay served by gNB as shown in Figure 5.3.1-2 and UE-to-Network Relay served by ng-eNB as shown in Figure 5.3.1-3.

Figure 7:
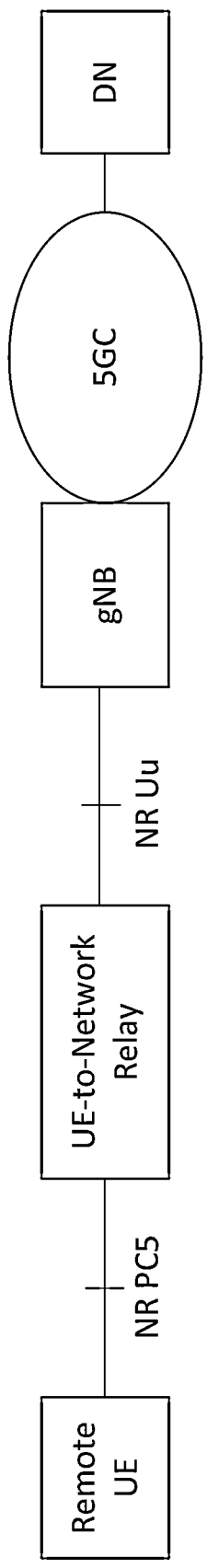
FIG. 7 is a reproduction of Figure 5.3.1-2 of 3GPP TR 23.752 V1.0.0.

[Figure 5.3.1-2 of 3GPP TR 23.752 V1.0.0, entitled "UE-to-Network Relay served by gNB", is reproduced as FIG. 7]

Figure 8:
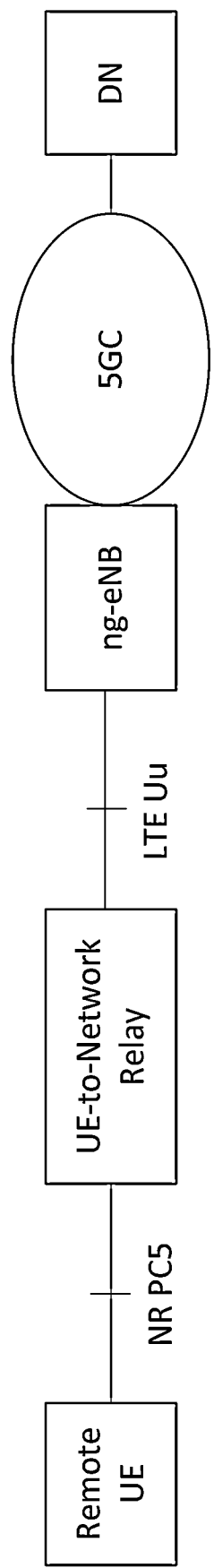
FIG. 8 is a reproduction of Figure 5.3.1-3 of 3GPP TR 23.752 V1.0.0.

[Figure 5.3.1-3 of 3GPP TR 23.752 V1.0.0, entitled "UE-to-Network Relay served by ng-eNB", is reproduced as FIG. 8]

NOTE 3: Whether to support the case that a UE-to-Network Relay is served by ng-eNB depends on solution to be identified in this study and RAN decision.

NOTE 4: When UE-to-Network Relay moves to E-UTRAN, LTE PC5 based ProSe UE-to-Network Relay can be supported as defined TS 23.303 [9] for Public Safety.

[ . . . ]

3GPP TR 38.836 captures the current agreements on UE-to-Network Relay as follows:

4 Sidelink-based UE-to-Network Relay
4.1 Scenarios, Assumptions and Requirements
The UE-to-Network Relay enables coverage extension and power saving for the Remote UE. The coverage scenarios considered in this study are the following:

UE-to-Network Relay UE is in coverage and Remote UE is out of coverage

UE-to-Network Relay UE and Remote UE are both in coverage

For L3 UE-to-Network Relay, Relay UE and Remote UE can be in the same cell or different cells, after Remote UE establishes connection via Relay UE For L2 UE-to-Network Relay, it is supported as baseline that after Remote UE connects via Relay UE, Relay UE and Remote UE are controlled by the Relay UE's serving cell For L2 UE-to-Network Relay, both cases below are supported, i.e.

Before remote connection via Relay UE, Relay UE and Remote UE are in the same cell;

Before remote connection via Relay UE, Relay UE and Remote UE are in different cells;

The considered scenarios are reflected in Figure 4.1-1.

Figure 9:
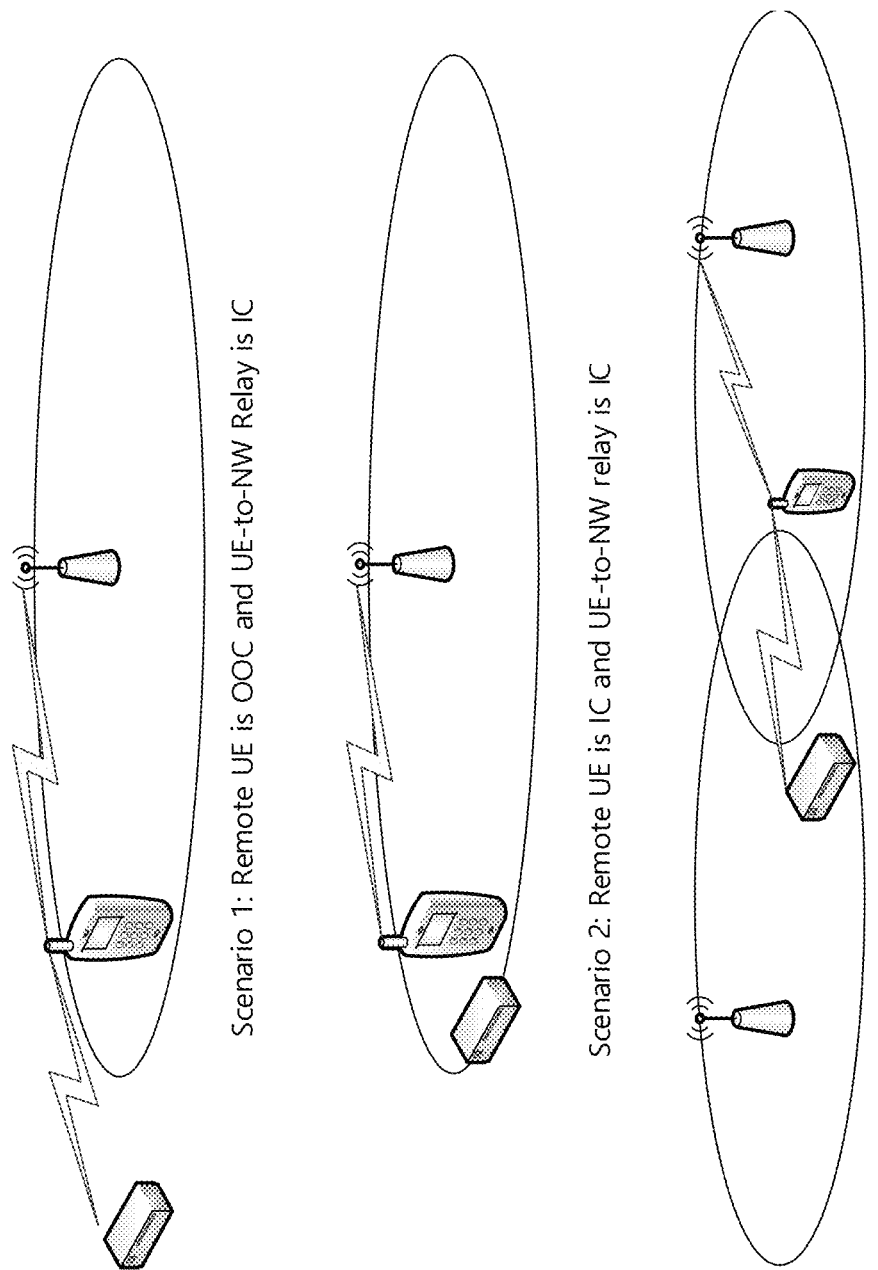
FIG. 9 is a reproduction of Figure 4.1-1 of 3GPP TR 38.836 V17.0.0.

[Figure 4.1-1 of 3GPP TR 38.836 V17.0.0, entitled "Scenarios for UE-to-Network Relay", is reproduced as FIG. 9]

NR Uu is assumed on the Uu link of the UE-to-Network Relay UE. NR sidelink is assumed on PC5 between the Remote UE(s) and the UE-to-Network Relay UE.

Cross-RAT configuration/control of UE (Remote UE or UE-to-Network Relay UE) is not considered, i.e., eNB/ng-eNB do not control/configure an NR Remote UE and UE-to-Network Relay UE. For UE-to-Network Relay, the study focuses on unicast data traffic between the Remote UE and the Network.

Configuring/scheduling of a UE (Remote UE or UE-to-Network Relay UE) by the SN to perform NR sidelink communication is out of scope of this study.

For UE-to-Network Relay, relaying of unicast data between the Remote UE and the network can occur after a PC5-RRC connection is established between the Relay UE and the Remote UE. The Uu RRC state of the Relay UE and Remote UE can change when connected via PC5. Both Relay UE and Remote UE can perform relay discovery in any RRC state. A Remote UE can perform relay discovery while out of Uu coverage.

A Relay UE must be in RRC_CONNECTED to perform relaying of unicast data.

For L2 UE-to-Network Relay:
  Remote UE(s) must be in RRC CONNECTED to perform transmission/reception of relayed unicast data.
  The Relay UE can be in RRC_IDLE, RRC_INACTIVE or RRC_CONNECTED as long as all the PC5-connected Remote UE(s) are in RRC_IDLE.
  The Relay UE can be in RRC_INACTIVE or RRC_CONNECTED as long as all the PC5-connected Remote UE(s) are in RRC_INACTIVE.

For L3 UE-to-Network Relay, both Relay UE and Remote UE can be in RRC_INACTIVE state. The requirement of service continuity is only for UE-to-Network Relay, but not for UE-to-UE Relay in this release.

RAN2 have studied the mobility scenario of "between direct (Uu) path and indirect (via the relay) path" for UE-to-Nework relay. RAN2 focus on the mobility scenarios of intra-gNB cases in the study phase, and assume the inter-gNB cases will also be supported. For the inter-gNB cases, compared to the intra-gNB cases, potential different parts on Uu interface in details can be discussed in the WI phase. RAN2 deprioritize work specific to the mobility scenario of "between indirect (via a first Relay UE) and indirect (via a second Relay UE)" for path switching in the SI phase, which can be studied in the WI phase, if needed.

RAN2 deprioritize the group mobility scenario in the SI phase, which may be discussed in WI phase, if needed.

4.2 Discovery

Model A and model B discovery model as defined in clause 5.3.1.2 of TS 23.303 [3] are supported for UE-to-Network Relay. The protocol stack of discovery message is described in Figure 4.2-1.

Figure 10:
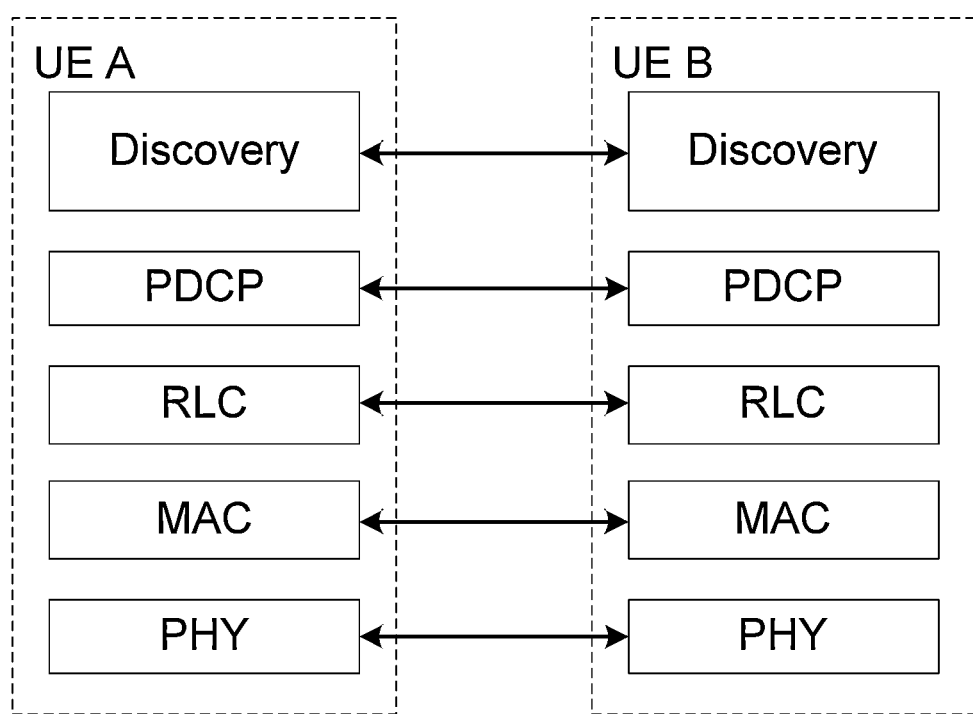
FIG. 10 is a reproduction of Figure 4.2-1 of 3GPP TR 38.836 V17.0.0.

[Figure 4.2-1 of 3GPP TR 38.836 V17.0.0, entitled "Protocol Stack of Discovery Message for UE-to-Network Relay", is reproduced as FIG. 10]

For Relay UE of UE-to-Network Relay:
  The Relay UE needs to be within a minimum and a maximum Uu signal strength threshold(s) if provided by gNB before it can transmit discovery message when in RRC_IDLE or in RRC_INACTIVE state.
  Relay UE is allowed to transmit discovery message based on NR sidelink communication configuration provided by gNB in all RRC states.
  Relay UE supporting L3 UE-to-Network Relay is allowed to transmit discovery message based on at least pre-configuration when it is connected to a gNB which is not capable of sidelink relay operation, in case its serving carrier is not shared with carrier for sidelink operation.
  Relay UE supporting L2 UE-to-Network Relay should be always connected to a gNB which is capable of sidelink relay operation including providing configurations for transmission of discovery messages.

For Remote UE of UE-to-Network Relay:
  The Remote UE in RRC_IDLE and RRC_INACTIVE state is allowed to transmit discovery message if measured signal strength of serving cell is lower than a configured threshold.
  Whether Remote UE in RRC_CONNECTED is allowed to transmit discovery is based on configuration provided by serving gNB. The detail of configuration provided by serving gNB can be discussed in WI phase.
  No additional network configuration is needed for Uu measurement by Remote UE in RRC_IDLE or RRC_INACTIVE.
  Remote UE out of coverage is always allowed to transmit discovery message based on pre-configuration while not connected with network through a Relay UE yet.
  Remote UE supporting UE-to-Network Relay is allowed to transmit discovery message based on at least pre-configuration when it is directly connected to a gNB which is not capable of sidelink relay operation, in case its serving carrier is not shared with SL carrier.
  For Remote UE supporting L3 UE-to-Network Relay which is out of coverage and connected to a gNB indirectly, it is not feasible for the serving gNB to provide radio configuration to transmit discovery message.
  For Remote UE supporting L2 UE-to-Network Relay which is out of coverage and connected to a gNB indirectly, whether it is allowed to transmit discovery message based on configuration provided by the gNB can be discussed in WI phase.

The detailed definition of a gNB which is not capable of sidelink relay operation can be left for WI phase but at least should include the case that the gNB does not provide SL relay configuration, e.g., no discovery configuration.

Resource pool to transmit discovery message can be either shared with or separated from resource pool for data transmission:
  For both shared resource pool and separated resource pool, a new LCID is introduced for discovery message, i.e., discovery message is carried by a new SL SRB.
  Within separated resource pool, discovery messages are treated equally with each other during the LCP procedure.

4.3 Relay (re-)selection criterion and procedure

The baseline solution for relay (re-)selection is as follow:
Radio measurements at PC5 interface are considered as part of relay (re-)selection criteria.
  Remote UE at least use the radio signal strength measurements of sidelink discovery messages to evaluate whether PC5 link quality of a Relay UE satisfies relay selection and reselection criterion.

When Remote UE is connected to a Relay UE, it may use SL-RSRP measurements on the sidelink unicast link to evaluate whether PC5 link quality with the Relay UE satisfies relay reselection criterion.

Further details on the PC5 radio measurements criteria, e.g., in case of no transmission on the sidelink unicast link can be discussed in WI phase. How to perform RSRP measurement based on RSRP of discovery message and/or SL-RSRP if Remote UE has PC5-RRC connection with Relay UE can be decided in WI phase.

For relay selection, as in LTE, an in-coverage Remote UE searches for a candidate Relay UE if direct Uu link quality of the Remote UE is below a configured threshold.

For relay (re-)selection, Remote UE compares the PC5 radio measurements of a Relay UE with the threshold which is configured by gNB or preconfigured. Higher layer criteria also need to be considered by Remote UE for relay (re-) selection, but details can be left to SA2 to decide. Relay (re-)selection can be triggered by upper layers of Remote UE.

Relay reselection should be triggered if the NR Sidelink signal strength of current Sidelink relay is below a (pre) configured threshold. Also, relay reselection may be triggered if RLF of PC5 link with current Relay UE is detected by Remote UE.

The above-described baseline for relay (re)selection apply to both L2 and L3 solutions. But for RRC_CONNECTED Remote UE connected through L2 UE-to-Network Relay scenario, gNB decision on relay selection/reselection is considered in WI phase under the above baseline. Additional AS layer criteria can be considered in WI phase for both L2 and L3 UE-to-Network Relay solutions.

For relay (re-)selection, when Remote UE has multiple suitable Relay UE candidates which meet all AS-layer & higher layer criteria and Remote UE need to select one Relay UE by itself, it is up to Remote UE implementation to choose one Relay UE. This does not exclude gNB involvement in service continuity for UE-to-Network Relay scenarios.

4.4 Relay/Remote UE Authorization

It is concluded that no impact on RAN2 is foreseen due to authorization of both Relay UE and Remote UE. The impact on RAN3, if any, will be done in WI phase for UE-to-Network Relay only.

4.5 Layer-2 Relay 4.5.1 Architecture and Protocol Stack 4.5.1.1 Protocol Stack

The protocol stacks for the user plane and control plane of L2 UE-to-Network Relay architecture are described in Figure 4.5.1.1-1 and Figure 4.5.1.1-2 for the case where adaptation layer is not supported at the PC5 interface, and Figure 4.5.1.1-3 and Figure 4.5.1.1-4 for the case where adaptation layer is supported at the PC5 interface.

For L2 UE-to-Network Relay, the adaptation layer is placed over RLC sublayer for both CP and UP at the Uu interface between Relay UE and gNB. The Uu SDAP/PDCP and RRC are terminated between Remote UE and gNB, while RLC, MAC and PHY are terminated in each link (i.e. the link between Remote UE and UE-to-Network Relay UE and the link between UE-to-Network Relay UE and the gNB). Whether the adaptation layer is also supported at the PC5 interface between Remote UE and Relay UE is left to WI phase (assuming down-selection first before studying too much on the detailed PC5 adaptation layer functionalities).

Figure 11:
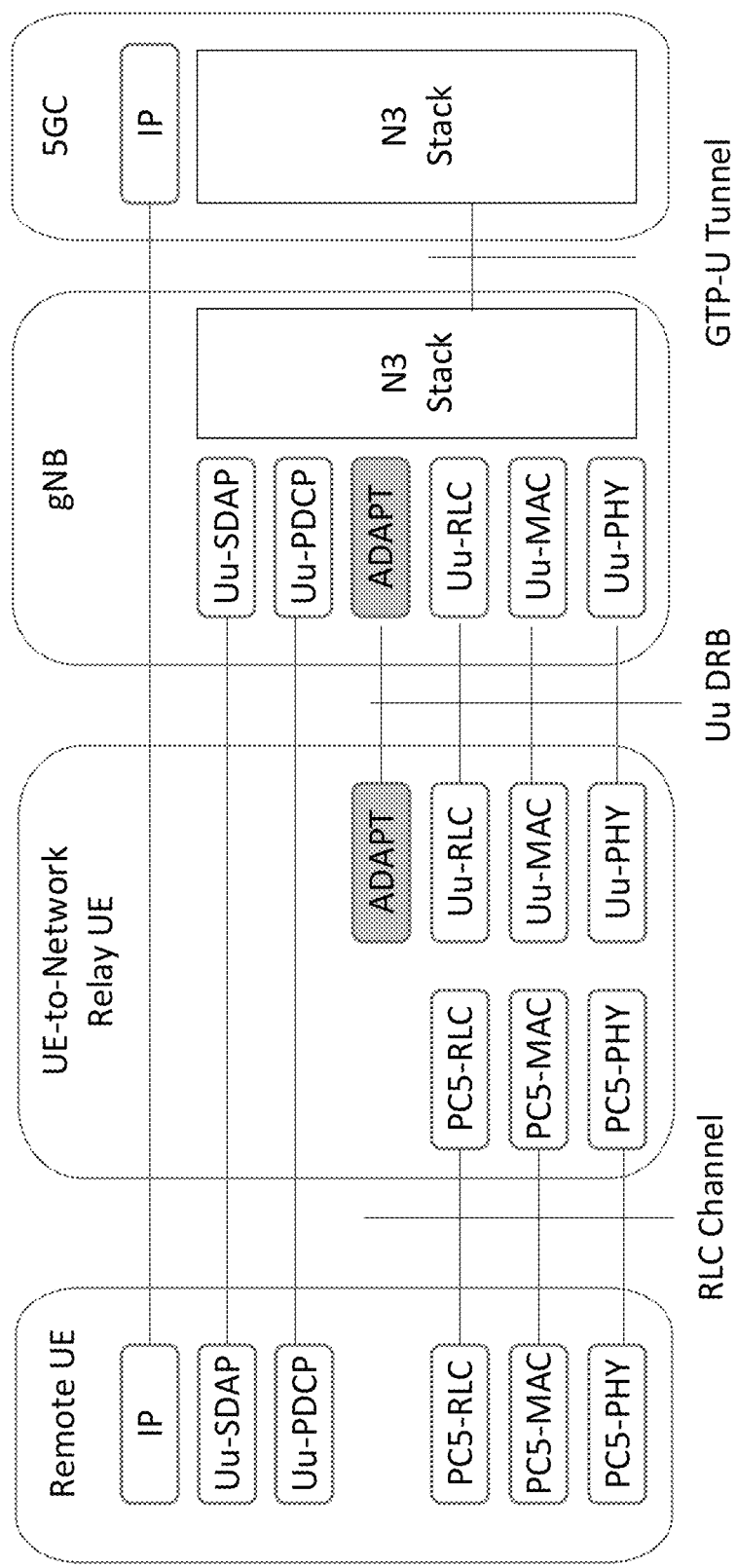
FIG. 11 is a reproduction of Figure 4.5.1.1-1 of 3GPP TR 38.836 V17.0.0.

[Figure 4.5.1.1-1 of 3GPP TR 38.836 V17.0.0, entitled "User plane protocol stack for L2 UE-to-Network Relay (adaptation layer is not supported at the PC5 interface)", is reproduced as FIG. 11]

Figure 12:
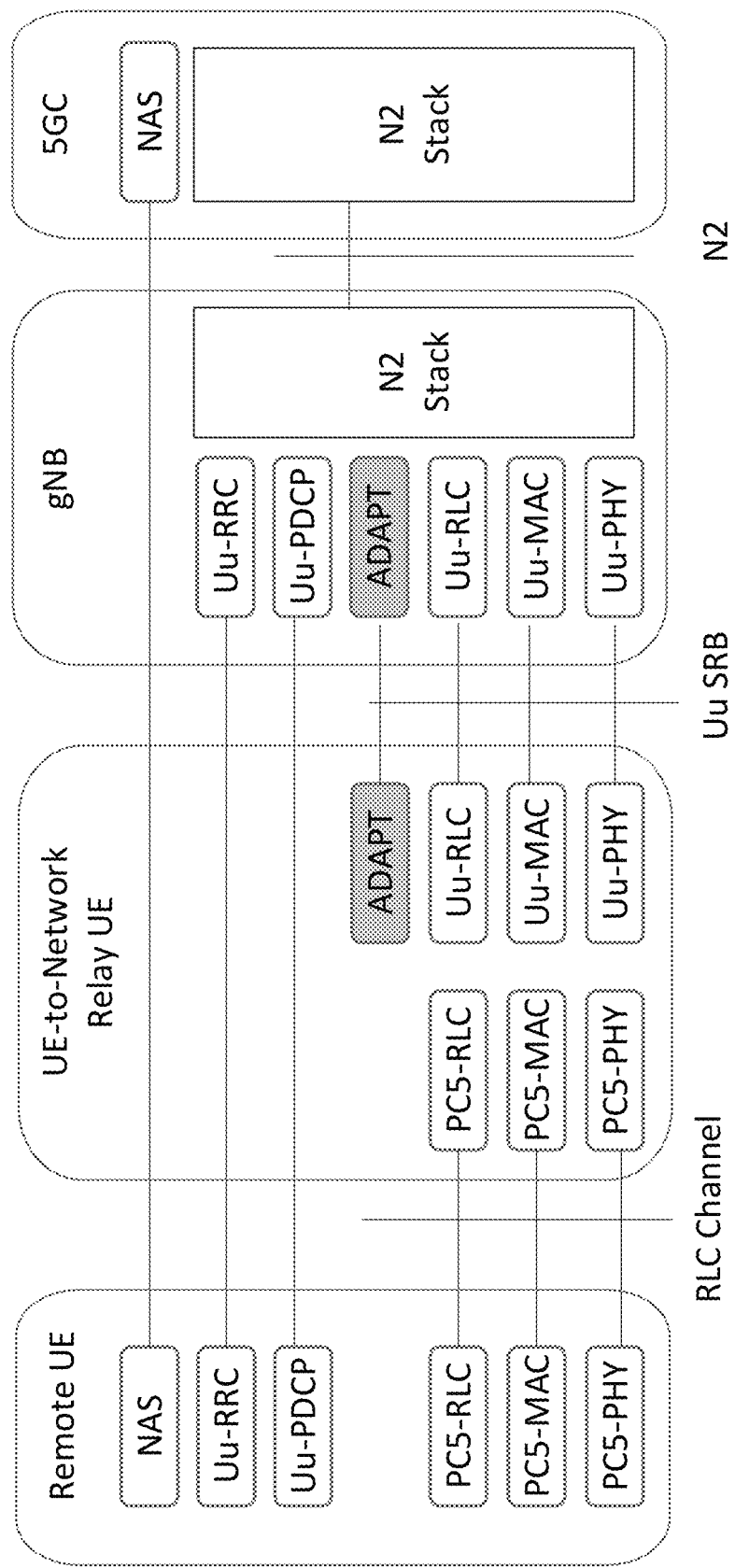
FIG. 12 is a reproduction of Figure 4.5.1.1-2 of 3GPP TR 38.836 V17.0.0.

[Figure 4.5.1.1-2 of 3GPP TR 38.836 V17.0.0, entitled "Control plane protocol stack for L2 UE-to-Network Relay (adaptation layer is not supported at the PC5 interface)", is reproduced as FIG. 12]

Figure 13:
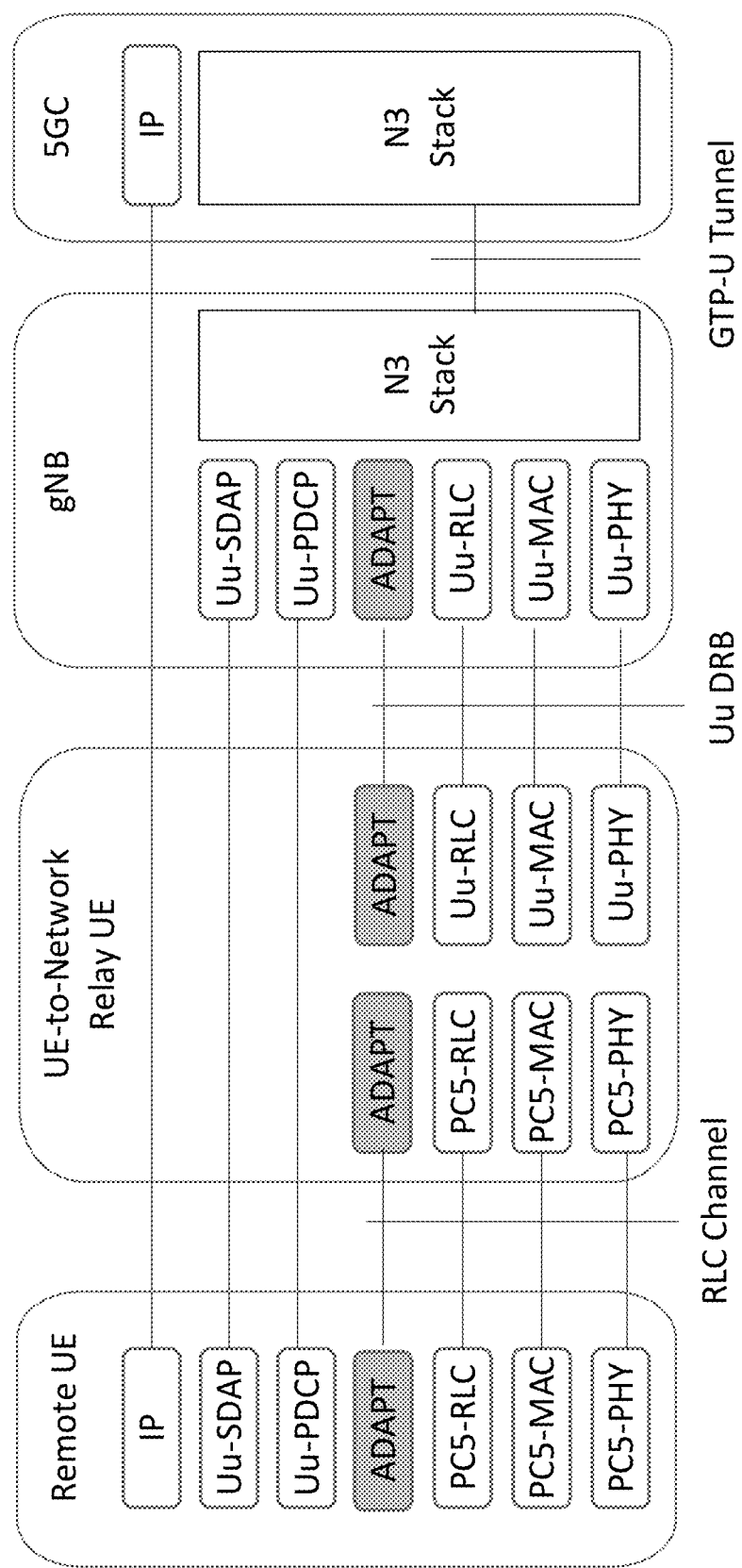
FIG. 13 is a reproduction of Figure 4.5.1.1-3 of 3GPP TR 38.836 V17.0.0.

[Figure 4.5.1.1-3 of 3GPP TR 38.836 V17.0.0, entitled "User plane protocol stack for L2 UE-to-Network Relay (adaptation layer is supported at the PC5 interface)", is reproduced as FIG. 13]

Figure 14:
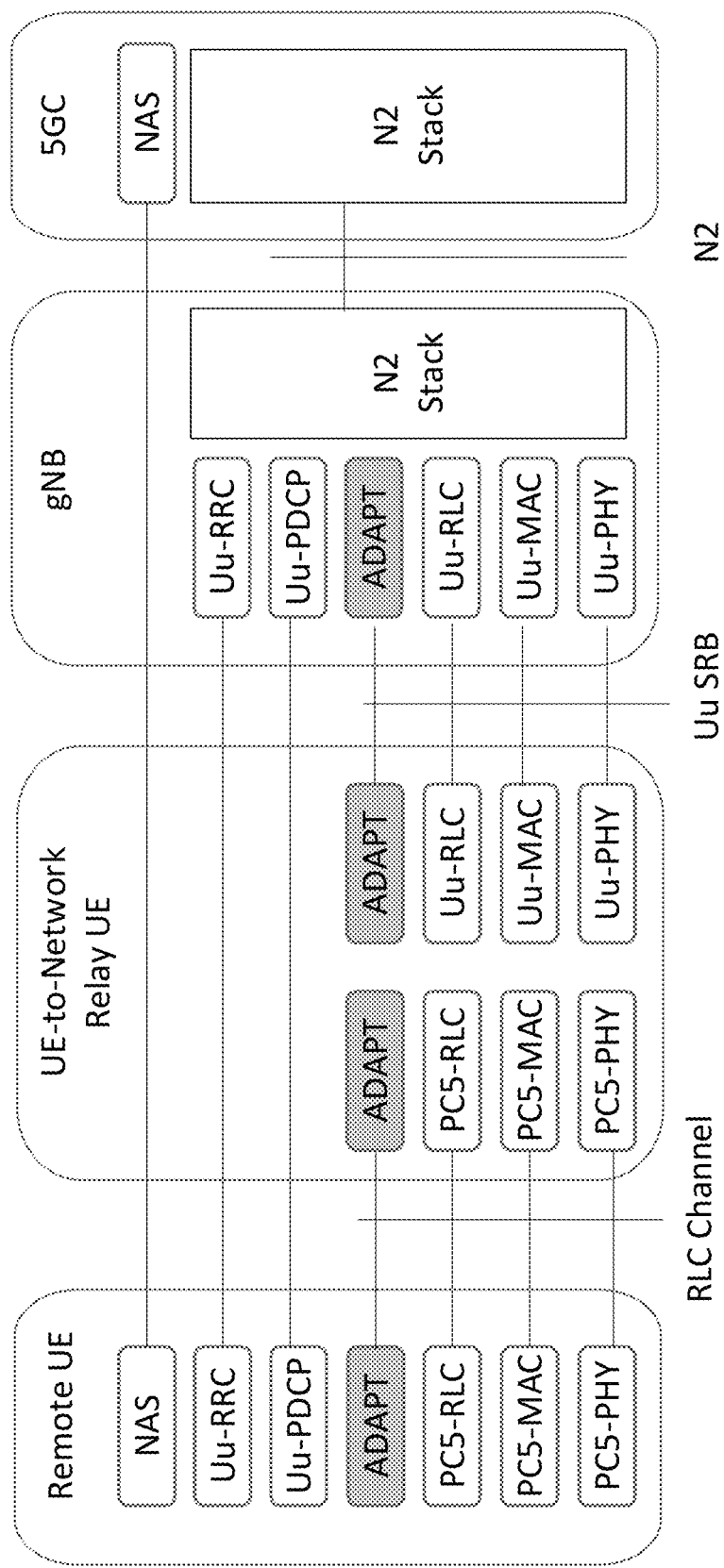
FIG. 14 is a reproduction of Figure 4.5.1.1-4 of 3GPP TR 38.836 V17.0.0.

[Figure 4.5.1.1-4 of 3GPP TR 38.836 V17.0.0, entitled "Control plane protocol stack for L2 UE-to-Network Relay (adaptation layer is supported at the PC5 interface)", is reproduced as FIG. 14]

4.5.1.2 Adaptation Layer Functionality

For L2 UE-to-Network Relay, for uplink:

The Uu adaptation layer at Relay UE supports UL bearer mapping between ingress PC5 RLC channels for relaying and egress Uu RLC channels over the Relay UE Uu path. For uplink relaying traffic, the different end-to-end RBs (SRB, DRB) of the same Remote UE and/or different Remote UEs can be subject to N:1 mapping and data multiplexing over one Uu RLC channel.

The Uu adaptation layer is used to support Remote UE identification for the UL traffic (multiplexing the data coming from multiple Remote UE). The identity information of Remote UE Uu Radio Bearer and Remote UE is included in the Uu adaptation layer at UL in order for gNB to correlate the received data packets for the specific PDCP entity associated with the right Remote UE Uu Radio Bearer of a Remote UE.

For L2 UE-to-Network Relay, for downlink:

The Uu adaptation layer can be used to support DL bearer mapping at gNB to map end-to-end Radio Bearer (SRB, DRB) of Remote UE into Uu RLC channel over Relay UE Uu path. The Uu adaptation layer can be used to support DL N:1 bearer mapping and data multiplexing between multiple end-to-end Radio Bearers (SRBs, DRBs) of a Remote UE and/or different Remote UEs and one Uu RLC channel over the Relay UE Uu path.

The Uu adaptation layer needs to support Remote UE identification for Downlink traffic. The identity information of Remote UE Uu Radio Bearer and the identity information of Remote UE needs be put into the Uu adaptation layer by gNB at DL in order for Relay UE to map the received data packets from Remote UE Uu Radio Bearer to its associated PC5 RLC channel.

4.5.2 QoS gNB implementation can handle the QoS breakdown over Uu and PC5 for the end-to-end QoS enforcement of a particular session established between Remote UE and network in case of L2 UE-to-Network Relay. Details of handling in case PC5 RLC channels with different end-to-end QoS are mapped to the same Uu RLC channel can be discussed in WI phase.

4.5.3 Security

As described in clause 6.7.2.8 of TR 23.752, in case of L2 UE-to-Network Relay, the security (confidentiality and integrity protection) is enforced at the PDCP layer between the endpoints at the Remote UE and the gNB. The PDCP traffic is relayed securely over two links, one between the Remote UE and the UE-to-Network Relay UE and the other between the UE-to-Network Relay UE to the gNB.

4.5.4 Service Continuity
4.5.4.0 General

L2 UE-to-Nework Relay uses the RAN2 principle of the Rel-15 NR handover procedure as the baseline AS layer solution to guarantee service continuit, i.e. gNB hands over the Remote UE to a target cell or target Relay UE, including:
1) Handover preparation type of procedure between gNB and Relay UE (if needed);
2) RRCReconfiguration to Remote UE, Remote UE switching to the target, and;
3) Handover complete message, similar to the legacy procedure.

Exact content of the messages (e.g. handover command) can be discussed in WI phase. This does not imply that we will send inter-node message over Uu.

Below, the common parts of intra-gNB cases and inter-gNB cases are captured. For the inter-gNB cases, compared to the intra-gNB cases, potential different parts on RAN2 Uu interface in details can be discussed in WI phase.

4.5.4.1 Switching from Indirect to Direct Path

For service continuity of L2 UE-to-Network relay, the following baseline procedure is used, in case of Remote UE switching to direct Uu cell.

Figure 15:
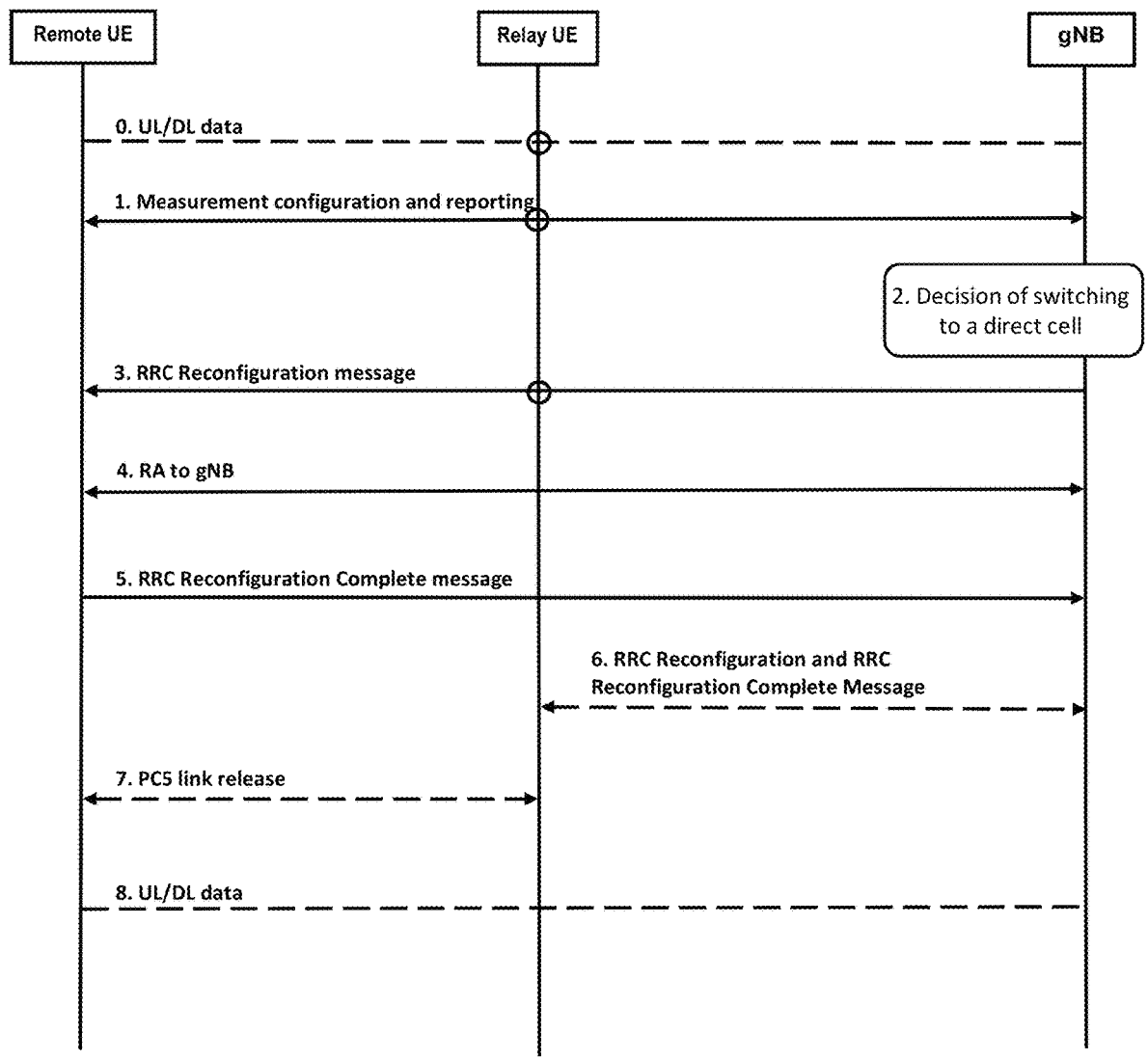
FIG. 15 is a reproduction of Figure 4.5.4.1-1 of 3GPP TR 38.836 V17.0.0.

[Figure 4.5.4.1-1 of 3GPP TR 38.836 V17.0.0, entitled "Procedure for Remote UE switching to direct Uu cell", is reproduced as FIG. 15]

Step 1: Measurement configuration and reporting
Step 2: Decision of switching to a direct cell by gNB
Step 3: RRC Reconfiguration message to Remote UE
Step 4: Remote UE performs Random Access to the gNB
Step 5: Remote UE feedback the RRCReconfigurationComplete to gNB via target path, using the target configuration provided in the RRC Reconfiguration message.
Step 6: RRC Reconfiguration to Relay UE
Step 7: The PC5 link is released between Remote UE and the Relay UE, if needed.
Step 8: The data path switching.
  NOTE: The order of step 6/7/8 is not restricted. Following are further discussed in WI phase, including:
    Whether Remote UE suspends data transmission via relay link after step 3;
    Whether Step 6 can be before or after step 3 and its necessity;
    Whether Step 7 can be after step 3 or step 5, and its necessity/replaced by PC5 reconfiguration;
    Whether Step 8 can be after step 5.

4.5.4.2 Switching from direct to indirect path

Figure 16:
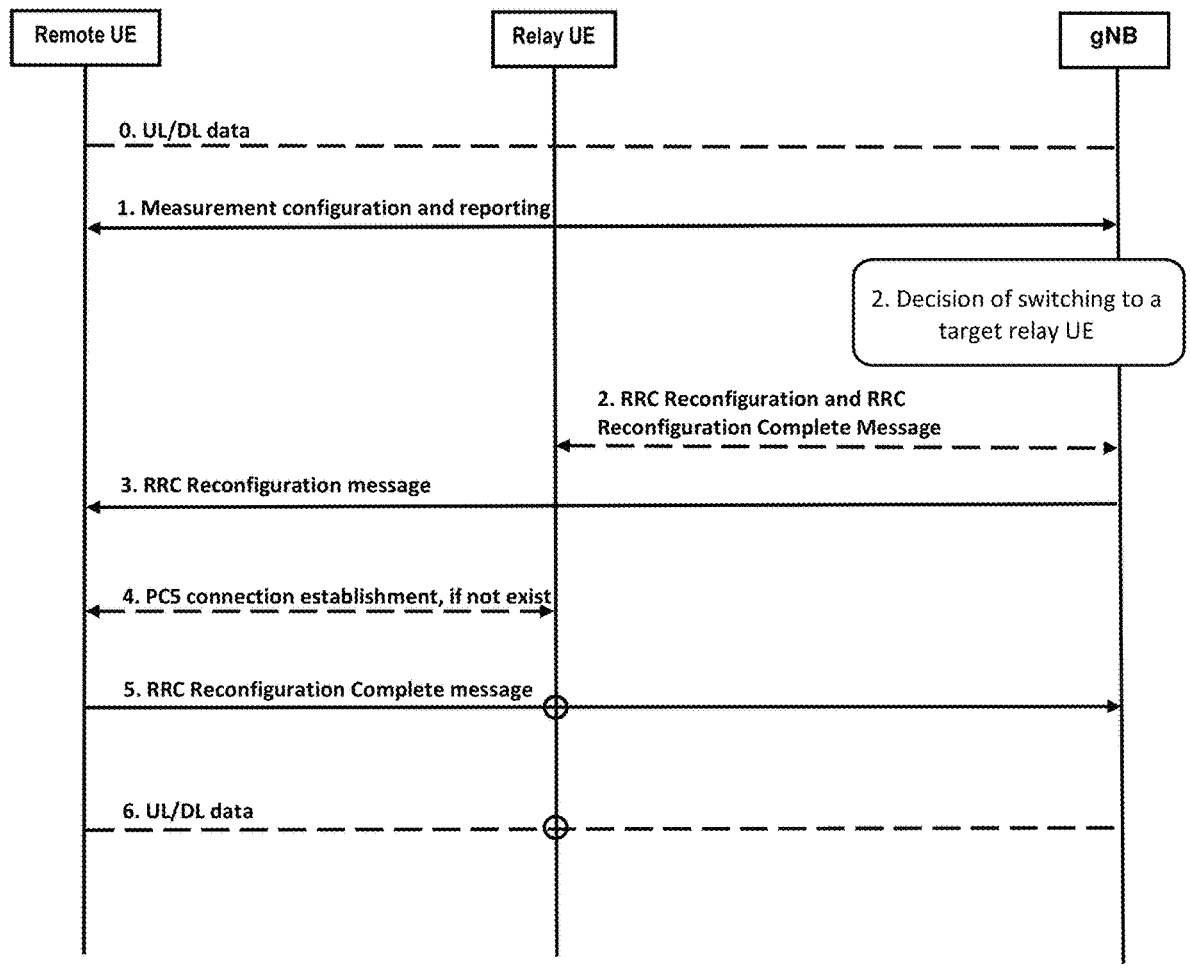
FIG. 16 is a reproduction of Figure 4.5.4.2-1 of 3GPP TR 38.836 V17.0.0.

For service continuity of L2 UE-to-Network Relay, the following baseline procedure is used, in case of Remote UE switching to indirect Relay UE:

[Figure 4.5.4.2-1 of 3GPP TR 38.836 V17.0.0, entitled "Procedure for Remote UE switching to indirect Relay UE", is reproduced as FIG. 16]

Step 1: Remote UE reports one or multiple candidate Relay UE(s), after Remote UE measures/discoveries the candidate Relay UE(s).
  Remote UE may filter the appropriate Relay UE(s) meeting higher layer criteria when reporting, in step 1.
  The reporting may include the Relay UE's ID and SL RSRP information, where the measurement on PC5 details can be left to WI phase, in step 1.
Step 2: Decision of switching to a target Relay UE by gNB, and target (re)configuration is sent to Relay UE optionally (like preparation).
Step 3: RRC Reconfiguration message to Remote UE. Following information may be included: 1) Identity of the target Relay UE; 2) Target Uu and PC5 configuration.
Step 4: Remote UE establishes PC5 connection with target Relay UE, if the connection has not been setup yet.
Step 5: Remote UE feedback the RRCReconfigurationComplete to gNB via target path, using the target configuration provided in RRCReconfiguration.
Step 6: The data path switching.
  NOTE: Following are further discussed in WI phase, including:
    Whether Step 2 should be after Relay UE connects to the gNB (e.g. after step 4), if not yet before;
    Whether Step 4 can be before step 2/3.

4.5.5 Control Plane Procedure
4.5.5.1 Connection Management

Remote UE needs to establish its own PDU sessions/DRBs with the network before user plane data transmission.

PC5-RRC aspects of Rel-16 NR V2X PC5 unicast link establishment procedures can be reused to setup a secure unicast link between Remote UE and Relay UE for L2 UE-to-Network relaying before Remote UE establishes a Uu RRC connection with the network via Relay UE.

For both in-coverage and out-of-coverage cases, when the Remote UE initiates the first RRC message for its connection establishment with gNB, the PC5 L2 configuration for the transmission between the Remote UE and the UE-to-Network Relay UE can be based on the RLC/MAC configuration defined in specifications.

The establishment of Uu SRB1/SRB2 and DRB of the Remote UE is subject to legacy Uu configuration procedures for L2 UE-to-Network Relay.

Figure 17:
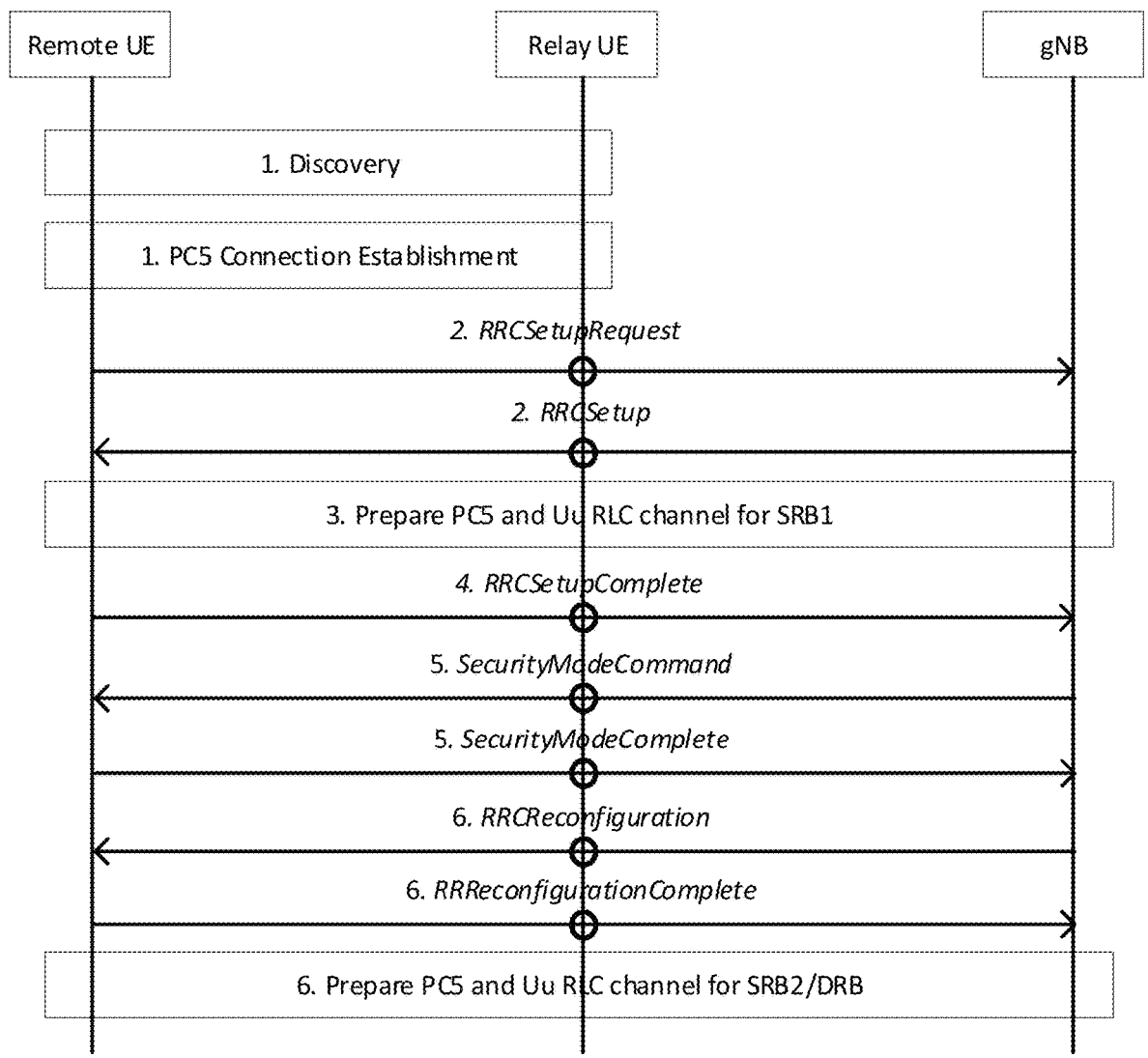
FIG. 17 is a reproduction of Figure 4.5.5.1-1 of 3GPP TR 38.836 V17.0.0.

The following high level connection establishment procedure applies to L2 UE-to-Network Relay:

[Figure 4.5.5.1-1 of 3GPP TR 38.836 V17.0.0, entitled "Procedure for Remote UE connection establishment", is reproduced as FIG. 17]

Step 1. The Remote and Relay UE perform discovery procedure, and establish PC5-RRC connection using the legacy Rel-16 procedure as a baseline.
Step 2. The Remote UE sends the first RRC message (i.e., RRCSetupRequest) for its connection establishment with gNB via the Relay UE, using a default L2 configuration on PC5. The gNB responds with an RRCSetup message to Remote UE. The RRCSetup delivery to the Remote UE uses the default configuration on PC5. If the Relay UE had not started in RRC_CONNECTED, it would need to do its own connection establishment upon reception of a message on the default L2 configuration on PC5. The details for Relay UE to forward the RRCSetupRequest/RRCSetup message for Remote UE at this step can be discussed in WI phase.
Step 3. The gNB and Relay UE perform relaying channel setup procedure over Uu. According to the configuration from gNB, the Relay/Remote UE establishes an RLC channel for relaying of SRB1 towards the Remote UE over PC5. This step prepares the relaying channel for SRB1.
Step 4. Remote UE SRB1 message (e.g. an RRCSetupComplete message) is sent to the gNB via the Relay UE using SRB1 relaying channel over PC5. Then the Remote UE is RRC connected over Uu.
Step 5. The Remote UE and gNB establish security following legacy procedure and the security messages are forwarded through the Relay UE.
Step 6. The gNB sets up additional RLC channels between the gNB and Relay UE for traffic relaying. According to the configuration from gNB, the Relay/Remote UE sets up additional RLC channels between the Remote UE and Relay UE for traffic relaying. The gNB sends an RRCReconfiguration to the Remote UE via the Relay UE, to set up the relaying SRB2/DRBs. The Remote UE sends an RRCReconfigurationComplete to the gNB via the Relay UE as a response. Besides the connection establishment procedure, for L2 UE-to-Network relay:

The RRC reconfiguration and RRC connection release procedures can reuse the legacy RRC procedure, with the message content/configuration design left to WI phase.

The RRC connection re-establishment and RRC connection resume procedures can reuse the legacy RRC procedure as baseline, by considering the above connection establishment procedure of L2 UE-to-Network Relay to handle the relay specific part, with the message content/configuration design left to WI phase.

3GPP TS 38.331 specifies the Radio Resource Control (RRC) connection establishment procedure as follows:

5.3 Connection Control

[ . . . ]

5.3.3 RRC Connection Establishment 5.3.3.1 General

Figure 18:
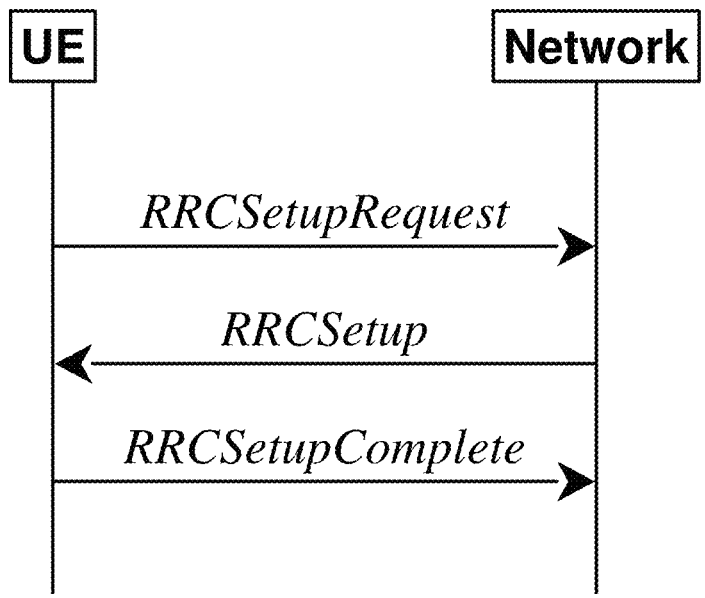
FIG. 18 is a reproduction of Figure 5.3.3.1-1 of 3GPP TS 38.331 V16.4.1.

[Figure 5.3.3.1-1 of 3GPP TS 38.331 V16.4.1, entitled "RRC connection establishment, successful", is reproduced as FIG. 18]

[ . . . ]

The purpose of this procedure is to establish an RRC connection. RRC connection establishment involves SRB1 establishment. The procedure is also used to transfer the initial NAS dedicated information/message from the UE to the network.

The network applies the procedure e.g. as follows:
When establishing an RRC connection;
When UE is resuming or re-establishing an RRC connection, and the network is not able to retrieve or verify the UE context. In this case, UE receives RRCSetup and responds with RRCSetupComplete.

[ . . . ]

5.3.5 RRC Reconfiguration 5.3.5.1 General

Figure 19:
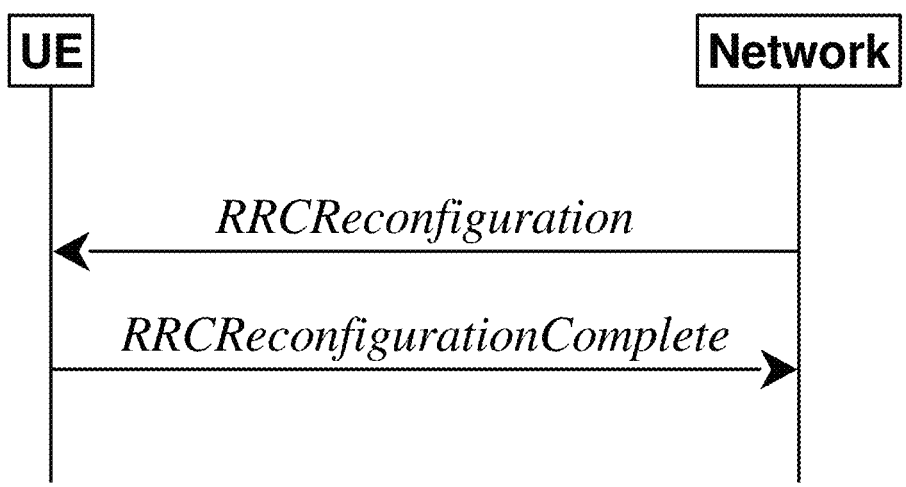
FIG. 19 is a reproduction of Figure 5.3.5.1-1 of 3GPP TS 38.331 V16.4.1.

[Figure 5.3.5.1-1 of 3GPP TS 38.331 V16.4.1, entitled "RRC reconfiguration, successful", is reproduced as FIG. 19]

[ . . . ]

The purpose of this procedure is to modify an RRC connection, e.g. to establish/modify/release RBs/BH RLC channels, to perform reconfiguration with sync, to setup/modify/release measurements, to add/modify/release SCells and cell groups, to add/modify/release conditional handover configuration, to add/modify/release conditional PSCell change configuration. As part of the procedure, NAS dedicated information may be transferred from the Network to the UE.

[ . . . ]

5.8.3 Sidelink UE Information for NR Sidelink Communication 5.8.3.1 General

Figure 20:
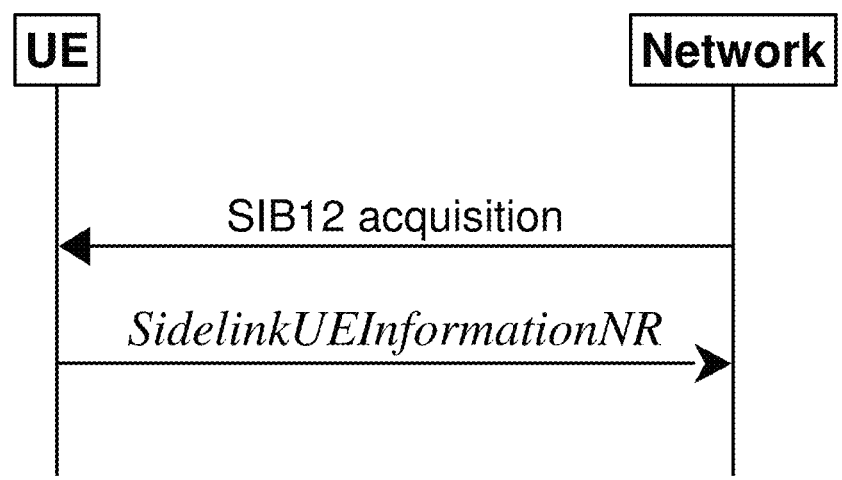
FIG. 20 is a reproduction of Figure 5.3.3.1-1 of 3GPP TS 38.331 V16.4.1.

[Figure 5.8.3.1-1 of 3GPP TS 38.331 V16.4.1, entitled "Sidelink UE information for NR sidelink communication", is reproduced as FIG. 20]

The purpose of this procedure is to inform the network that the UE:
is interested or no longer interested to receive or transmit NR sidelink communication,
is requesting assignment or release of transmission resource for NR sidelink communication,
is reporting QoS parameters and QoS profile(s) related to NR sidelink communication,
is reporting that a sidelink radio link failure or sidelink RRC reconfiguration failure has been detected,
is reporting the sidelink UE capability information of the associated peer UE for unicast communication,
is reporting the RLC mode information of the sidelink data radio bearer(s) received from the associated peer UE for unicast communication.

[ . . . ]

RRCSetup

The RRCSetup message is used to establish SRB1.
Signalling radio bearer: SRB0
RLC-SAP: TM
Logical channel: CCCH
Direction: Network to UE

| RRCSetup message |
|---|
| -- ASN1START |
| -- TAG-RRCSETUP-START |
| RRCSetup ::=                              SEQUENCE { |
|    rrc-TransactionIdentifier              RRC-TransactionIdentifier, |
|    criticalExtensions                     CHOICE { |
|       rrcSetup                            RRCSetup- IEs, |
|       criticalExtensionsFuture            SEQUENCE { } |
|    } |
| } |
| RRCSetup-IEs : : =                        SEQUENCE { |
|    radioBearerConfig                      RadioBearerConfig, |
|    masterCellGroup                        OCTET STRING (CONTAINING CellGroupConfig) |
|    lateNonCriticalExtension               OCTET STRING OPTIONAL, |
|    nonCriticalExtension                   SEQUENCE{ } OPTIONAL |
| } |
| -- TAG-RRCSETUP-STOP |
| -- ASN1STOP |

RRCSetup-IEs field descriptions masterCellGroup

The network configures only the RLC bearer for the SRB1, mac-CellGroupConfig, physicalCellGroupConfig and spCellConfig.

radioBearerConfig

Only SRB1 can be configured in RRC setup.

RRCSetupComplete

The RRCSetupComplete message is used to confirm the successful completion of an RRC connection establishment.
Signalling radio bearer: SRB1
RLC-SAP: AM
Logical channel: DCCH
Direction: UE to Network

| RRCSetupComplete message |
|---|
| -- ASN1START |
| -- TAG-RRCSETUPCOMPLETE-START |
| RRCSetupComplete : :=                     SEQUENCE { |
|    rrc-TransactionIdentifier              RRC-TransactionIdentifier, |
|    criticalExtensions                     CHOICE { |

| RRCSetupComplete message |  |  |
|---|---|---|
| rrcSetupComplete | RRCSetupComplete-IEs, |  |
|     criticalExtensionsFuture | SEQUENCE { } |  |
| } |  |  |
| } |  |  |
| RRCSetupComplete-IEs ::= | SEQUENCE { |  |
|   selectedPLMN-Identity | INTEGER (1..maxPLMN), |  |
|   registeredAMF | RegisteredAMF | OPTIONAL, |
|   guami-Type | ENUMERATED {native, mapped} | OPTIONAL, |
|   s-NSSAI-List | SEQUENCE (SIZE (1..maxNrofS-NSSAI)) OF S-NS-SAI | OPTIONAL, |
|   dedicatedNAS-Message | DedicatedNAS-Message, |  |
|   ng-5G-S-TMSI-Value | CHOICE { |  |
|     ng-5G-S-TMSI | NG-5G-S-TMSI, |  |
|     ng-5G-S-TMSI-Part2 | BIT STRING (SIZE (9)) |  |
|   } |  | OPTIONAL, |
|   lateNonCriticalExtension | OCTET STRING | OPTIONAL, |
|   nonCriticalExtension | RRCSetupComplete-v1610-IEs | OPTIONAL |
| } |  |  |
| RRCSetupComplete-v1610-IEs ::= | SEQUENCE { |  |
|   iab-NodeIndication-r16 | ENUMERATED {true} | OPTIONAL, |
|   idleMeasAvailable-r16 | ENUMERATED {true} | OPTIONAL, |
|   ue-MeasurementsAvailable-r16 | UE-MeasurementsAvailable-r16 | OPTIONAL, |
|   mobilityHistoryAvail-r16 | ENUMERATED {true} | OPTIONAL, |
|   mobilityState-r16 | ENUMERATED {normal, medium, high, spare} | OPTIONAL, |
|   nonCriticalExtension | SEQUENCE{ } | OPTIONAL |
| } |  |  |
| RegisteredAMF ::= | SEQUENCE { |  |
|   plmn-Identity | PLMN-Identity | OPTIONAL, |
|   amf-Identifier | AMF-Identifier |  |
| } |  |  |
| -- TAG-RRCSETUPCOMPLETE-STOP |  |  |
| -- ASN1STOP |  |  |

| RRCSetupComplete-IEs field descriptions |
|---|
| guami-Type |
| This field is used to indicate whether the GUAMI included is native (derived from native 5G-GUTI) or mapped (from EPS, derived from EPS GUTI) as specified in TS 24.501 [23]. |
| iab-NodeIndication |
| This field is used to indicate that the connection is being established by an IAB-node as specified in TS 38.300 [2]. |
| idleMeasAvailable |
| Indication that the UE has idle/inactive measurement report available. |
| mobilityState |
| This field indicates the UE mobility state (as defined in TS 38.304 [20], clause 5.2.4.3) just prior to UE going into RRC_CONNECTED state. |

| RRCSetupComplete-IEs field descriptions |
|---|
| The UE indicates the value of medium and high when being in Medium-mobility and High-mobility states respectively. Otherwise the UE indicates the value normal. |
| ng-5G-S-TMSI-Part2 |
| The leftmost 9 bits of 5G-S-TMSI. |
| registeredAMF |
| This field is used to transfer the GUAMI of the AMF where the UE is registered, as provided by upper layers, see TS 23.003 [21]. |
| selectedPLMN-Identity |
| Index of the PLMN or SNPN selected by the UE from the plmn-IdentityList or npn-IdentityInfoList fields included in SIB1. |

RRCSetupRequest

The RRCSetupRequest message is used to request the establishment of an RRC connection.

Signalling radio bearer: SRB0
    RLC-SAP: TM
    Logical channel: CCCH
    Direction: UE to Network

| RRCSetupRequest message |  |
|---|---|
| -- ASN1START |  |
| -- TAG-RRCSETUPREQUEST-START |  |
| RRCSetupRequest ::= | SEQUENCE { |
|   rrcSetupRequest | RRCSetupRequest-IEs |
| } |  |
| RRCSetupRequest-IEs ::= | SEQUENCE { |
|   ue-Identity | InitialUE-Identity, |
|   establishmentCause | EstablishmentCause, |
|   spare | BIT STRING (SIZE (1)) |
| } |  |

-continued

| RRCSetupRequest message | |
|---|---|
| InitialUE-Identity ::= | CHOICE { |
|    ng-5G-S-TMSI-Part1 |    BIT STRING (SIZE (39)), |
|    randomValue |    BIT STRING (SIZE (39)) |
| } | |
| EstablishmentCause : := | ENUMERATED { |
| PriorityAccess, mcs-PriorityAccess, |    emergency, highPriorityAccess, mt-Access, mo-Signalling |
| |    mo-Data, mo-VoiceCall, mo-VideoCall, mo-SMS, mps- |
| |    spare6, spare5, spare4, spare3, spare2, spare1) |
| -- TAG-RRCSETUPREQUEST-STOP | |
| -- ASN1STOP | |

| RRCSetupRequest-IEs field descriptions |
|---|
| establishmentCause |
| Provides the establishment cause for the RRCSetupRequest in accordance with the information received from upper layers. gNB is not expected to reject an RRCSetupRequest due to unknown cause value being used by the UE. |
| ue-Identity |
| UE identity included to facilitate contention resolution by lower layers. |

| InitialUE-Identity field descriptions |
|---|
| ng-5G-S-TMSI-Part1 |
| The rightmost 39 bits of 5G-S-TMSI. |
| randomValue |
| Integer value in the range 0 to $2^{39} - 1$. |

RRCReconfigurationComplete

The RRCReconfigurationComplete message is used to confirm the successful completion of an RRC connection reconfiguration.

Signalling radio bearer: SRB1 or SRB3
   RLC-SAP: AM
   Logical channel: DCCH
   Direction: UE to Network

| RRCReconfiguration Complete message | |
|---|---|
| -- ASN1START | |
| -- TAG-RRCRECONFIGURATIONCOMPLETE-START | |
| RRCReconfigurationComplete : := | SEQUENCE { |
|    rrc-TransactionIdentifier |    RRC-TransactionIdentifier, |
|    criticalExtensions |    CHOICE { |
|       rrcReconfigurationComplete |       RRCReconfigurationComplete-IEs |
|       criticalExtensionsFuture |       SEQUENCE { } |
|    } | |
| } | |
| RRCReconfigurationComplete-IEs : := | SEQUENCE { |
|    lateNonCriticalExtension |    OCTET STRING |
| OPTIONAL, | |
|    nonCriticalExtension |    RRCReconfigurationComplete-v1530-IEs |
| OPTIONAL | |
| } | |
| RRCReconfigurationComplete-v1530-IEs : := | SEQUENCE { |
|    uplinkTxDirectCurrentList |    UplinkTxDirectCurrentList |
| OPTIONAL, | |
|    nonCriticalExtension |    RRCReconfigurationComplete-v1560-IEs |
| OPTIONAL | |
| } | |
| RRCReconfigurationComplete-v1560-IEs : := | SEQUENCE { |
|    scg-Response |    CHOICE { |
|       nr-SCG-Response |       OCTET STRING (CONTAINING |
| RRCReconfigurationComplete), | |
|       eutra-SCG-Response |       OCTET STRING |
| } | |
| OPTIONAL, | |
|    nonCriticalExtension |    RRCReconfigurationComplete-v1610-IEs |
| OPTIONAL | |
| } | |
| RRCReconfigurationComplete-v1610-IEs : := | SEQUENCE { |
|    ue-MeasurementsAvailable-r16 |    UE-MeasurementsAvailable-r16 |
| OPTIONAL, | |
|    needForGapsInfoNR-r16 |    NeedForGapsInfoNR-r16 |
| OPTIONAL, | |
|    nonCriticalExtension |    RRCReconfigurationComplete-v1640-IEs |
| OPTIONAL | |
| } | |
| RRCReconfigurationComplete-v1640-IEs : := | SEQUENCE { |

| RRCReconfiguration Complete message |
| --- |
| uplinkTxDirectCurrentTwoCarrierList-r16     UplinkTxDirectCurrentTwoCarrierList- rl6<br>OPTIONAL,<br>   nonCriticalExtension                                       SEQUENCE { }<br>OPTIONAL<br>}<br>-- TAG-RRCRECONFIGURATIONCOMPLETE-STOP<br>-- ASN1STOP |

| RRCReconfigurationComplete-IEs field descriptions |
| --- |
| needForGapsInfoNR |
| This field is used to indicate the measurement gap requirement information of the UE for NR target bands. |
| scg-Response |
| In case of NR-DC (nr-SCG-Response), this field includes the RRCReconfigurationComplete message. In case of NE-DC (eutra-SCG-Response), this field includes the E-UTRA RRCConnectionReconfigurationComplete message as specified in TS 36.331 [10]. |
| uplinkTxDirectCurrentList |
| The Tx Direct Current locations for the configured serving cells and BWPs if requested by the NW (see reportUplinkTxDirectCurrent in CellGroupConfig). |
| uplinkTxDirectCurrentTwoCarrierList |
| The Tx Direct Current locations for the configured uplink intra-band CA with two carriers if requested by the NW (see reportUplinkTxDirectCurrentTwoCarrier-r16 in CellGroupConfig). |

Key issue #4 in 3GPP TR 23.752 describes support of UE-to-Network Relay in the following release (i.e. Release 17), which means a relay UE will be used to support communication between a remote UE and the network in case the remote UE cannot access the network directly. There are two different types of solutions for UE-to-Network Relay proposed in 3GPP TR 23.752, i.e. a Layer-2 based UE-to-Network Relay and a Layer-3 based UE-to-Network Relay.

In 3GPP TR 23.752, both Model A discovery and Model B discovery are supported for the remote UE to discover a UE-to-Network Relay. Model A uses a single discovery protocol message (i.e. Discovery Announcement) and Model B uses two discovery protocol messages (i.e. Discovery Solicitation and Discovery Response). In case there are multiple relay UEs in proximity of the remote UE, one of the relay UEs will be selected. After selecting a suitable relay UE, the remote UE will then establish a PC5 unicast link with the relay UE to support UE-to-Network Relay operation.

To access a concerned service from a data network (DN), a Protocol Data Unit (PDU) session should be established with the DN and the PDU Session Establishment Request message includes an S-NSSAI and a DNN associated with the PDU session. In the Layer-2 UE-to-Network Relay solution, the remote UE establishes a PDU session with the network via the relay UE, while the relay UE establishes the PDU session with the network for the remote UE in the Layer-3 UE-to-Network Relay solution.

Section 4.5.4.2 of 3GPP TR 38.836 specifies the procedure for Remote UE switching from direct to indirect communication path in case of Layer-2 based UE-to-Network Relay. In Step 2 of Figure 4.5.4.2-1 (which is reproduced as FIG. 16) of 3GPP TR 38.836, the RRC Reconfiguration message sent from gNB to the Relay UE may include information indicating the Uu and/or SSL (or PC5) configurations (for forwarding RRC messages on SRB(s) (e.g. SRB1, SRB2) of the remote UE to gNB and/or for forwarding data packets on Data Radio Bearer (DRB) of the remote UE to gNB) to be applied by the Relay UE for supporting UE-to-Network Relay operation after the path switching. In this situation, there is a need for the Relay UE to know which Remote UE to apply the Uu and/or SL (or PC5) configurations in case there may be multiple Remote UEs requesting for establishing PC5 unicast link or PC5-RRC connection with the Relay UE during the concerned period of time.

To support Layer-2 based UE-to-Network Relay, an adaptation layer may be placed over the Radio Link Control (RLC) sublayer for both CP and UP at the Uu interface between the relay UE and the gNB. And, a local ID of the remote UE may be included in a header of an adaptation layer PDU to identify the remote UE. Each local ID is unique within the relay UE and may be assigned by either the relay UE or the gNB. Thus, the local ID of the remote UE may be included in the RRC Reconfiguration message sent by the gNB to provide the Uu and/or SL (or PC5) configurations. In this situation, there is a need for both the gNB and the relay UE to know the association between the local ID and certain identity of Remote UE before transmission/reception of the RRC Reconfiguration message. Potential methods to meet that need are described below.

Method 1-1: The local Identity/Identifier (ID) of Remote UE is assigned by gNB and then is passed to the relay UE via the remote UE:

1. The remote UE firstly communicates with gNB via Uu interface.
2. The remote UE could send a measurement report (including information to identify each candidate relay UE e.g. L2ID) to gNB.
3. The remote UE could receive a RRCReconfiguration message (indicating a target relay UE for path switch and a local ID of the remote UE) from gNB for path switch (from Uu/direct path to Relay/indirect path).
4. In response to reception of the RRCreconfiguration message, the remote UE could establish a layer-2 link with the target relay UE. The remote UE could send a PC5-S message (in which the local ID of the remote UE could be included) for establishing the layer-2 link to the relay UE. Alternatively, the local ID of the remote UE could be included in a PC5-S message sent by the remote UE to the relay UE for completing establishment of security context for the layer-2 link in response to reception of a PC5-S message for requesting establishment of security context for the layer-2 link from the relay UE. It is also possible for the remote UE to provide the local ID of the remote UE to the relay UE via e.g. a PC5-RRC message, a PC5 adaptation layer control PDU (if PC5 adaptation layer over the relay UE and the remote UE is supported) or a PC5 MAC control element after the layer-2 link is established. The relay UE could then associate the remote UE with the local ID.
5. The remote UE could send a RRCReconfigurationComplete message (corresponding to the RRCReconfiguration message in Step 3) to gNB via the relay UE, wherein the RRCReconfigurationComplete message is included in an adaptation layer PDU and the relay UE sets the Remote UE ID field in a header of the adaptation layer PDU to the local ID of the remote UE.
6. gNB can decipher the RRCReconfigurationComplete message based on the remote UE's security key/algorithm according to the local ID of the remote UE in the adaptation layer PDU header.
7. gNB could then send the Uu and/or SL (or PC5) configurations for the remote UE and the local ID of the remote UE associated with the Uu and/or SL (or PC5) configurations to the relay UE via a RRC Reconfiguration message.

Method 1-2: The local ID of Remote UE is assigned by gNB and is configured to the relay UE by gNB:
1. The remote UE firstly communicates with gNB via Uu interface.
2. The remote UE could send a measurement report (including information to identify each candidate relay UE e.g. L2ID) to gNB.
3. The remote UE receives a RRCReconfiguration message (indicating a target relay UE for path switch) from gNB for path switch (from Uu/direct path to Relay/indirect path).
4. In response to reception of the RRCReconfiguration message, the remote UE could establish a layer-2 link with the target relay UE. The remote UE could provide an identification of the remote UE (e.g. C-RNTI or (partial) initial UE Identity, or temporal UE ID provided in the RRCReconfiguration message in Step 3) to the relay UE. The identification of the remote UE could be provided to the relay UE via a PC5-RRC message. Alternatively, the identification of the remote UE could be provided to the relay UE via a PC5-S message (within the layer-2 link establishment procedure between the remote UE and the relay UE). The PC5-S message (e.g. Direct Communication Request) could be used for requesting establishment of the layer-2 link. The PC5-S message (e.g. Security Mode Complete) could be used for completing establishment of security context for the layer-2 link. The relay UE could then report the identification of the remote UE to gNB (via e.g. a SidelinkUEInformation message) for the gNB to assign a local ID of the remote UE to be included in adaptation layer PDU header. The gNB could then maintain the association between the local ID and the identification of the remote UE. More specifically, the relay UE could provide a Layer-2 ID of the remote UE and the identification of the remote UE associated with the Layer-2 ID of the remote UE (via e.g. the SidelinkUE-Information message) to gNB. In response to reception of the identification of the remote UE from the relay UE, gNB could send the Uu and/or SL (or PC5) configurations for the remote UE and the local ID of the remote UE associated with the Uu and/or SL (or PC5) configurations to the relay UE via a RRC Reconfiguration message for the relay UE. The RRC Reconfiguration message for the relay UE could also indicate the relay UE with an association between the local ID of the remote UE and (a destination index corresponding to) the Layer-2 ID of the remote UE. In case PC5 adaptation layer is supported, the relay UE may need to transmit the local ID of the remote UE to the remote UE so that the remote UE can include the local ID in the adaptation layer header for UL transmission.
5. The remote UE could send a RRCReconfigurationComplete message (corresponding to the RRCReconfiguration message in Step 3) to gNB via the relay UE, wherein the RRCReconfigurationComplete message is included in an adaptation layer PDU to be sent from the relay UE to gNB, and the relay UE could set the Remote UE ID field in a header of the adaptation layer PDU to the local ID of the remote UE.
6. gNB could decipher the RRCReconfigurationComplete message based on the remote UE's security key/algorithm according to the local ID of the remote UE in the adaptation layer PDU header.
7. Alternatively, gNB could then send the Uu and/or SL (or PC5) configurations for the remote UE to the relay UE after the RRCReconfigurationComplete message of the remote UE has been received (and/or deciphered successfully).

Figure 21:
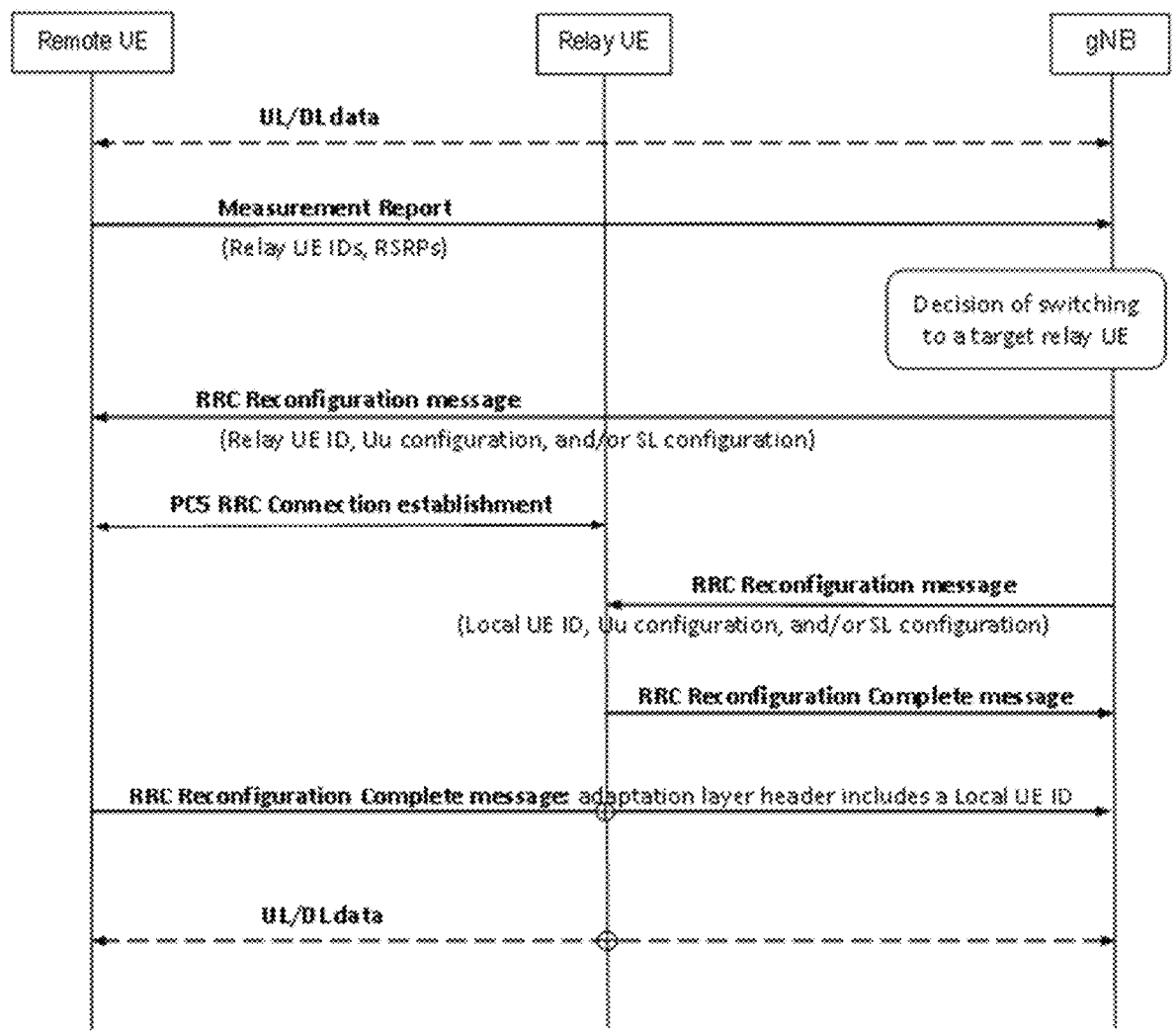
FIG. 21 is a flow diagram according to one exemplary embodiment.

Method 1-1 and Method 1-2 could be illustrated in FIG. 21.

Method 1-3: gNB assigns the local ID of Remote UE after decision of path switching to a target relay UE:
1. One or more relay UEs may be in the proximity of the remote UE and each relay UE could report its own L2ID for relay communication to gNB (via e.g. SidelinkUEInformationNR).
2. The remote UE could report a L2ID of the remote UE for relay communication to gNB (via e.g. SidelinkUEInformationNR).
3. The remote UE firstly communicates with gNB via Uu interface.
4. The remote UE could send a measurement report (including information to identify each candidate relay UE e.g. L2ID) to gNB. The L2ID of the remote UE could be alternatively included in the measurement report.
5. According to L2IDs of the candidate relay UEs reported by the remote UE and L2IDs of Relay UE reported by every relay UE in the proximity of the relay UE, gNB could select a target relay UE for the remote UE for path switching from direct to indirect communication. gNB could then assign a local UE ID of the remote UE for the target relay UE. Alternatively, gNB could assign the local UE ID of the remote UE for the target relay UE right before step 7. Each local UE ID may be unique within the scope of the target relay UE.
6. The remote UE could receive a RRCReconfiguration message (indicating the target relay UE for path switch) from gNB for path switch (from Uu/direct path to Relay/indirect path). The RRCReconfiguration message for the remote UE could include the L2ID of the target relay UE. The RRCReconfiguration message could include the Uu and/or SL (or PC5) configurations for establishing a Uu SRB and/or a SL (or PC5) RLC channel for sending a RRCReconfigurationComplete message corresponding to the RRCReconfiguration message for the remote UE to gNB via the target relay UE.
7. The target relay UE could receive a RRCReconfiguration (including the local UE ID of the remote UE and the L2ID of the remote UE) from gNB. The RRCReconfiguration for the target UE could also include Uu and/or SL (or PC5) configurations for establishing a Uu RLC channel and/or a SL (or PC5) RLC channel for relay communication.

8. In response to reception of the RRCReconfiguration for the target relay UE, the target relay UE could send a RRCReconfigurationComplete to gNB.
9. In response to reception of the RRCReconfiguration message, the remote UE could establish a layer-2 link with the target relay UE based on the L2ID of the target relay UE. The remote UE could send a PC5-S message (e.g. Direct Communication Request) for requesting establishment of the layer-2 link.
10. The remote UE could then receive a PC5-S message (e.g. Direct Communication Accept) for completing the establishment of the layer-2 link from the target relay UE.
11. The remote UE could send a RRCReconfigurationComplete message (corresponding to the RRCReconfiguration message in Step 6) to gNB via the relay UE, wherein the RRCReconfigurationComplete message is included in an adaptation layer PDU to be sent from the relay UE to gNB, and the relay UE could set the Remote UE ID field in a header of the adaptation layer PDU to the local ID of the remote UE (as configured in the RRCReconfiguration message for the target relay UE in Step 7). gNB could then decipher the RRCReconfigurationComplete message for the remote UE based on the remote UE's security key/algorithm according to the local ID of the remote UE in the adaptation layer PDU header.
12. The remote UE could start to communicate with gNB via the target relay UE.

Figure 22:
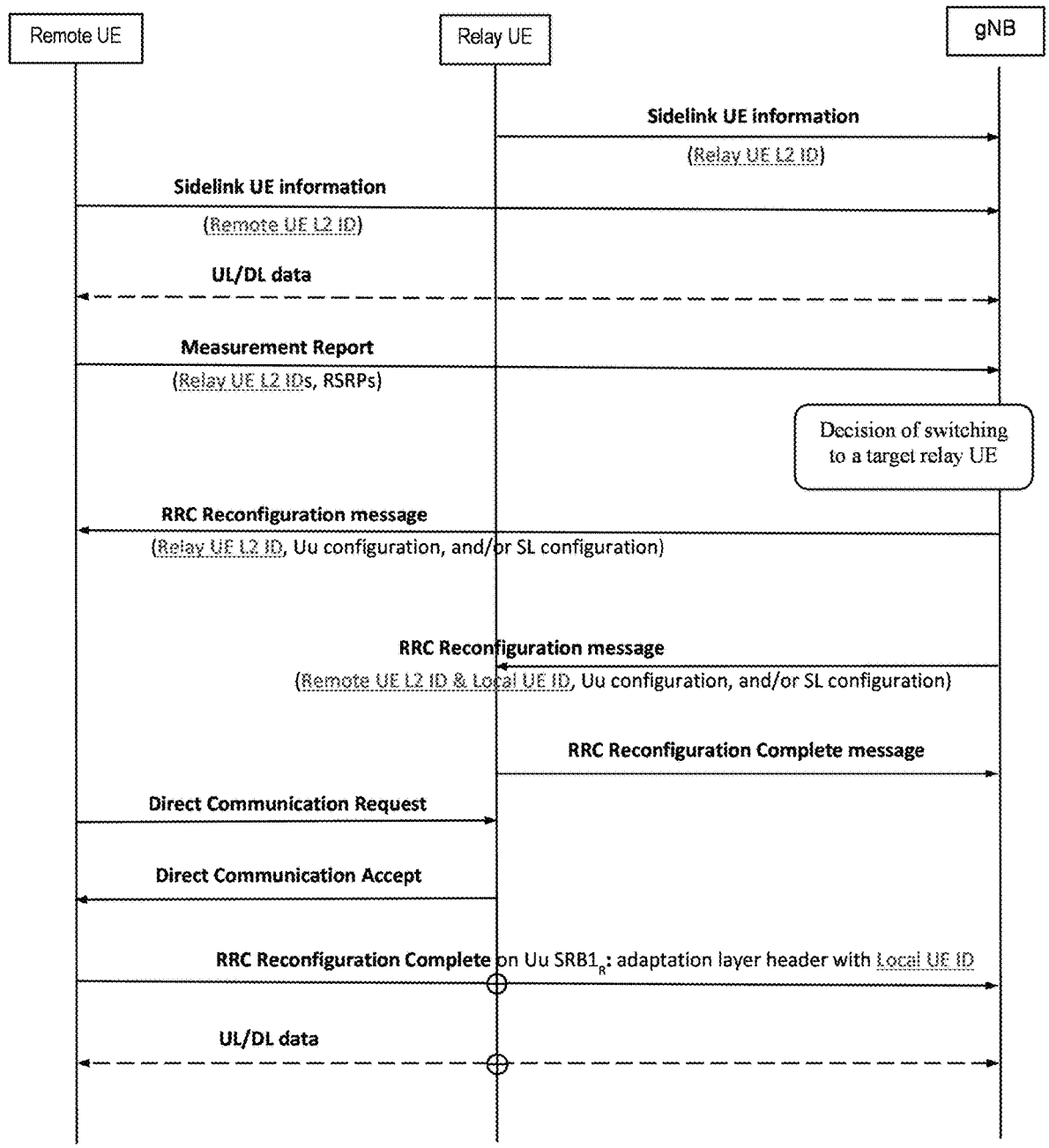
FIG. 22 is a flow diagram according to one exemplary embodiment.

Method 1-3 could be illustrated in FIG. 22. The order of steps described above or in FIG. 22 is merely an example of one of the potential solutions. The order is flexible (and not strict) and may be changed to form another potential solution if the resulting procedure still works. For example, the order of step 1 and step 2 may change. In addition, step 1 and/or step 2 may occur at any time before step 5 (i.e. decision of path switching to a target relay UE). Furthermore, step 7 and step 8 may occur in parallel with step 9 and step 10.

Figure 24:
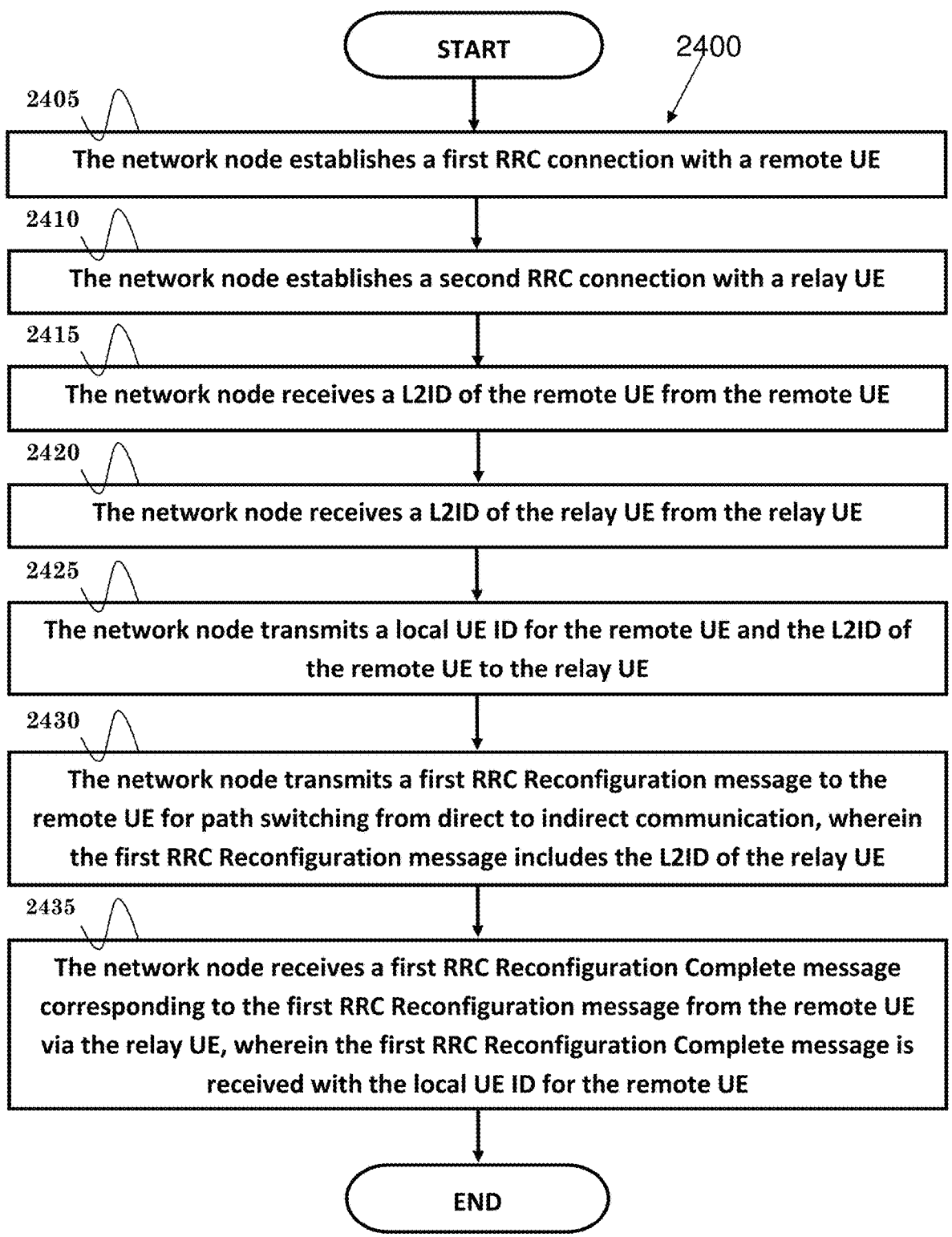
FIG. 24 is a flow chart according to one exemplary embodiment.

In the context of Method 1-3 discussed above, FIG. 24 is a flow chart 2400 from the perspective of a network node. In step 2405, the network node establishes a first RRC connection with a remote UE. In step 2410, the network node establishes a second RRC connection with a relay UE. In step 2415, the network node receives a L2ID of the remote UE from the remote UE. In step 2420, the network node receives a L2ID of the relay UE from the relay UE. In step 2425, the network node transmits a local UE ID for the remote UE and the L2ID of the remote UE to the relay UE. In step 2430, the network node transmits a first RRC Reconfiguration message to the remote UE for path switching from direct to indirect communication, wherein the first RRC Reconfiguration message includes the L2ID of the relay UE. In step 2435, the network node receives a first RRC Reconfiguration Complete message corresponding to the first RRC Reconfiguration message from the remote UE via the relay UE, wherein the first RRC Reconfiguration Complete message is received with the local UE ID for the remote UE.

In one embodiment, the local UE ID for the remote UE and the L2ID could be included in a second RRC Reconfiguration message transmitted from the network node to the relay UE. The first RRC Reconfiguration message could include a Uu SRB configuration and/or a PC5 (or SL) RLC channel configuration for the remote UE transmitting the first RRC Reconfiguration Complete message to the network node via the relay UE. The second RRC Reconfiguration message could include a Uu RLC channel configuration and/or a PC5 (or SL) RLC channel configuration for the relay UE forwarding the first RRC Reconfiguration Complete message to the network node via the relay UE. The first RRC Reconfiguration Complete message could be included in an adaptation layer PDU and the local UE ID for the remote UE is included in a header of the adaptation layer PDU.

In one embodiment, the L2ID of the relay UE could be transmitted to the network node via a first SidelinkUEInformationNR message. The L2ID of the remote UE could be transmitted to the network node via a second SidelinkUEInformationNR message. The network node could be a base station (e.g. gNB).

Referring back to FIGS. 3 and 4, in one exemplary embodiment of a method for a network node, the network node 300 includes a program code 312 stored in the memory 310. The CPU 308 could execute program code 312 to enable the network node (i) to establish a first RRC connection with a remote UE, (ii) to establish a second RRC connection with a relay UE, (iii) to receive a L2ID of the remote UE from the remote UE, (iv) to receive a L2ID of the relay UE from the relay UE, (v) to transmit a local UE ID for the remote UE and the L2ID of the remote UE to the relay UE, (vi) to transmit a first RRC Reconfiguration message to the remote UE for path switching from direct to indirect communication, wherein the first RRC Reconfiguration message includes the L2ID of the relay UE, and (vii) to receive a first RRC Reconfiguration Complete message corresponding to the first RRC Reconfiguration message from the remote UE via the relay UE, wherein the first RRC Reconfiguration Complete message is received with the local UE ID for the remote UE. Furthermore, the CPU 308 can execute the program code 312 to perform all of the above-described actions and steps or others described herein.

Method 1-4: gNB assigns the local ID of Remote UE after receiving SidelinkUEInformationNR from Relay UE:
1. The remote UE could report a L2ID of the remote UE for relay communication to gNB (via e.g. SidelinkUEInformationNR).
2. The remote UE firstly communicates with gNB via Uu interface.
3. The remote UE could send a measurement report (including information to identify each candidate relay UE e.g. L2ID) to gNB. The L2ID of the remote UE could be alternatively included in the measurement report.
4. According to L2IDs of the candidate relay UEs reported by the remote UE, gNB could select a target relay UE for the remote UE for path switching from direct to indirect communication.
5. The remote UE could receive a RRCreconfiguration message (indicating the target relay UE for path switch) from gNB for path switch (from Uu/direct path to Relay/indirect path). The RRCReconfiguration message for the remote UE could include the L2ID of the target relay UE. The RRCreconfiguration message could include the Uu and/or SL (or PC5) configurations for establishing a Uu SRB and/or a SL (or PC5) RLC channel for sending a RRCReconfigurationComplete message corresponding to the RRCReconfiguration message for the remote UE to gNB via the target relay UE.
6. In response to reception of the RRCreconfiguration message, the remote UE could establish a layer-2 link with the target relay UE based on the L2ID of the target relay UE. The remote UE could send a PC5-S message (e.g. Direct Communication Request) for requesting establishment of the layer-2 link.

7. In response to reception of the Direct Communication Request, the target relay UE could report the L2ID of the remote UE to gNB via SidelinkUEInformationNR. gNB could then assign a local UE ID of the remote UE for the target relay UE after receiving the SidelinkUEInformationNR. Each local UE ID may be unique within the scope of the target relay UE.
 8. The target relay UE could receive a RRCReconfiguration (including the local UE ID of the remote UE and the L2ID or a destination index of the remote UE) from gNB. The RRCReconfiguration for the target UE could also include Uu and/or SL (or PC5) configurations for establishing a Uu RLC channel and/or a SL (or PC5) RLC channel for relay communication. Here, the destination index of the remote UE could be an index of the L2ID of the remote UE in a destination list included in the SidelinkUEInformationNR message.
 9. In response to reception of the RRCReconfiguration for the target relay UE, the target relay UE could send a RRCReconfigurationComplete to gNB.
 10. The remote UE could then receive a PC5-S message (e.g. Direct Communication Accept) for completing the establishment of the layer-2 link from the target relay UE.
 11. The remote UE could send a RRCReconfigurationComplete message (corresponding to the RRCReconfiguration message in Step 5) to gNB via the relay UE, wherein the RRCReconfigurationComplete message is included in an adaptation layer PDU to be sent from the relay UE to gNB, and the relay UE could set the Remote UE ID field in a header of the adaptation layer PDU to the local ID of the remote UE (as configured in the RRCReconfiguration message for the target relay UE in Step 8). gNB could then decipher the RRCReconfigurationComplete message for the remote UE based on the remote UE's security key/algorithm according to the local ID of the remote UE in the adaptation layer PDU header.
 12. The remote UE could start to communicate with gNB via the target relay UE.

Figure 23:
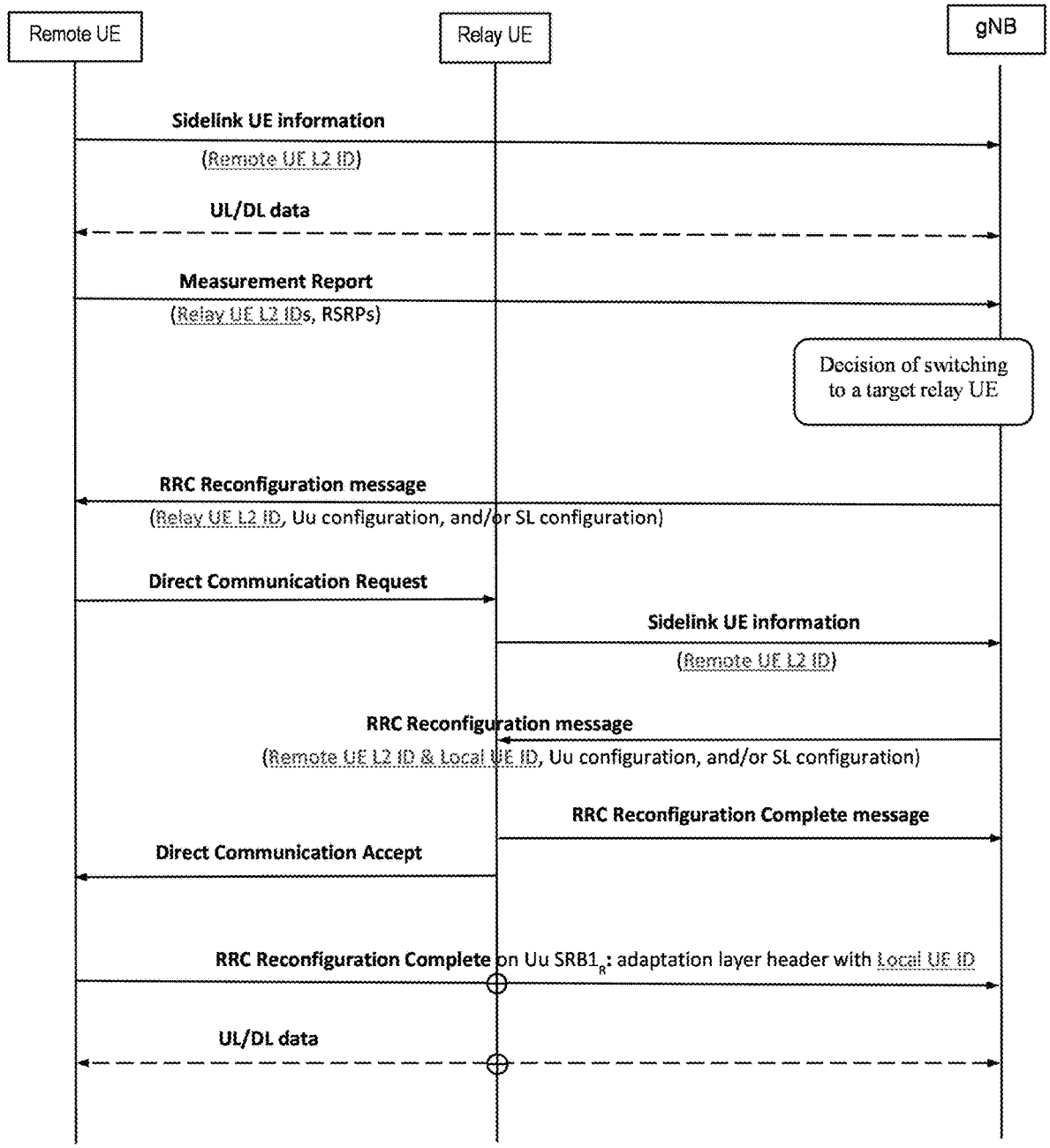
FIG. 23 is a flow diagram according to one exemplary embodiment.

Method 1-4 could be illustrated in FIG. 23. The order of steps described above or in FIG. 23 is merely an example of one of the potential solutions. The order is flexible (and not strict) and may be changed to form another potential solution if the resulting procedure still works.

It is noted that a RRC Reconfiguration message is used by the gNB to provide radio configuration(s) to a Remote UE or a Relay UE and the Remote UE or the Relay UE may then reply with a RRC Reconfiguration Complete message. Other terms may be used to replace these two RRC messages for the same purpose(s).

In one embodiment, the Remote UE may transmit a measurement report to the gNB so that the gNB can make the decision to switch the communication path of the Remote UE to a target Relay UE. The measurement report may include at least information identifying one relay UE and one sidelink reference signal received power (RSRP) measured on the discovery message or sidelink reference signal transmitted by the relay UE. The Remote UE may report measurement result of multiple relay UEs including the target Relay UE.

In one embodiment, the RRC Reconfiguration message (directly) transmitted from the gNB to the remote UE may include a first Uu configuration and/or a first SL (or PC5) configuration associated with a Uu SRB (e.g. SRB1) of the remote UE used for transmitting the RRC Reconfiguration Complete message to the network node via the relay UE. The RRC Reconfiguration message may also include a Uu configuration and/or a SL (or PC5) configuration associated with a Uu DRB of the remote UE used for transmitting data packets to the gNB via the relay UE.

Figure 25:
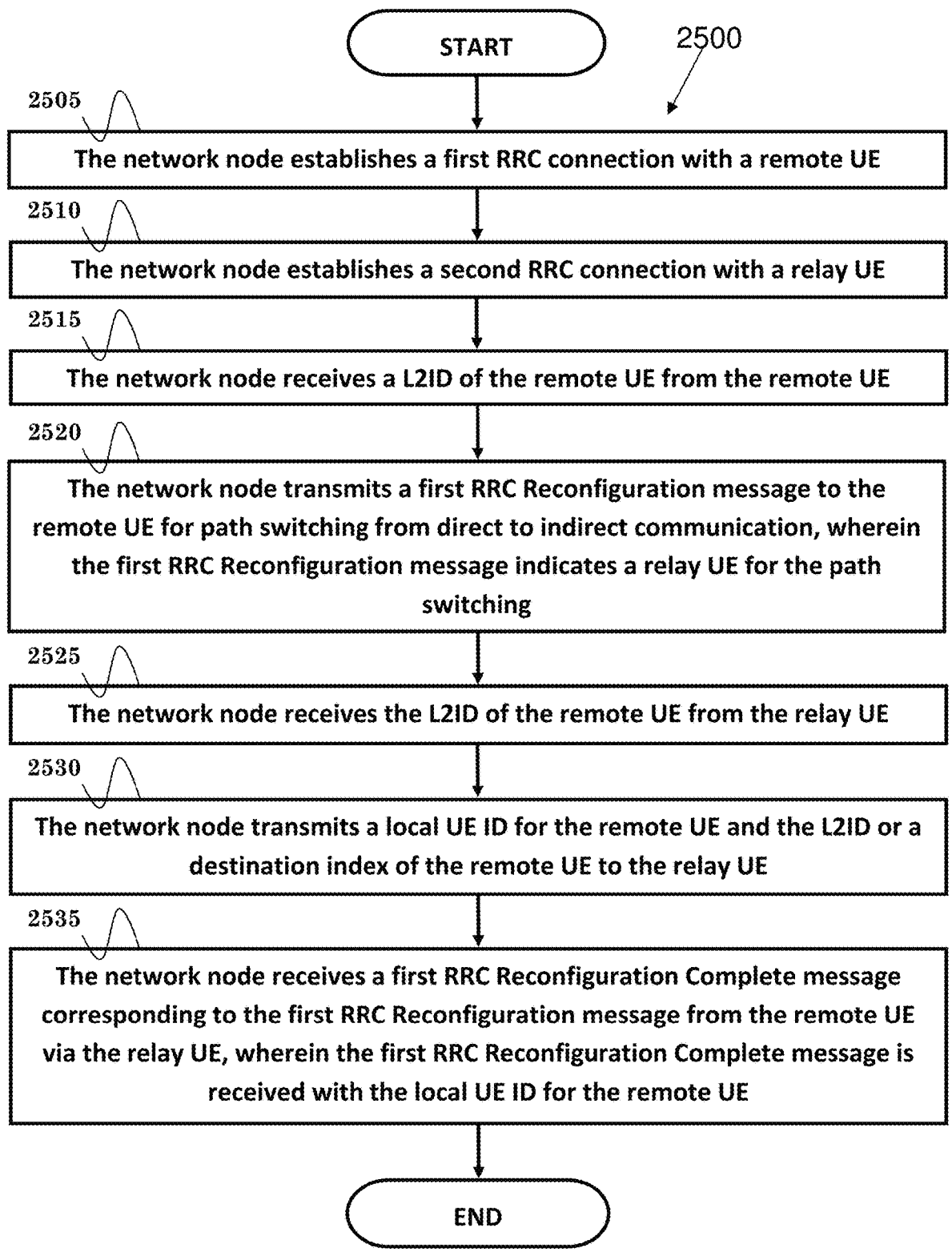
FIG. 25 is a flow chart according to one exemplary embodiment.

In the context of Method 1-4 discussed above, FIG. 25 is a flow chart 2500 from the perspective of a network node. In step 2505, the network node establishes a first RRC connection with a remote UE. In step 2510, the network node establishes a second RRC connection with a relay UE. In step 2515, the network node receives a L2ID of the remote UE from the remote UE. In step 2520, the network node transmits a first RRC Reconfiguration message to the remote UE for path switching from direct to indirect communication, wherein the first RRC Reconfiguration message indicates a relay UE for the path switching. In step 2525, the network node receives the L2ID of the remote UE from the relay UE. In step 2530, the network node transmits a local UE ID for the remote UE and the L2ID or a destination index of the remote UE to the relay UE. In step 2535, the network node receives a first RRC Reconfiguration Complete message corresponding to the first RRC Reconfiguration message from the remote UE via the relay UE, wherein the first RRC Reconfiguration Complete message is received with the local UE ID for the remote UE.

In one embodiment, the local UE ID for the remote UE and the L2ID or the destination index of the remote UE could be included in a second RRC Reconfiguration message transmitted from the network node to the relay UE. The first RRC Reconfiguration message could include a Uu SRB configuration and/or a PC5 (or SL) RLC channel configuration for the remote UE transmitting the first RRC Reconfiguration Complete message to the network node via the relay UE. The second RRC Reconfiguration message could include a Uu RLC channel configuration and/or a PC5 (or SL) RLC channel configuration for the relay UE forwarding the first RRC Reconfiguration Complete message to the network node via the relay UE. The first RRC Reconfiguration Complete message could be included in an adaptation layer PDU and the local UE ID for the remote UE is included in a header of the adaptation layer PDU.

In one embodiment, the L2ID of the remote UE could be transmitted by the remote UE to the network node via a first SidelinkUEInformationNR message. The L2ID of the remote UE could be transmitted by the relay UE to the network node via a second SidelinkUEInformationNR message. The destination index of the remote UE could be an index of the L2ID of the remote UE in a destination list included in the second SidelinkUEInformationNR. The network node could be a base station (e.g. gNB).

Referring back to FIGS. 3 and 4, in one exemplary embodiment of a method for a network node, the network node 300 includes a program code 312 stored in the memory 310. The CPU 308 could execute program code 312 to enable the network node (i) to establish a first RRC connection with a remote UE, (ii) to establish a second RRC connection with a relay UE, (iii) to receive a L2ID of the remote UE from the remote UE, (iv) to transmit a first RRC Reconfiguration message to the remote UE for path switching from direct to indirect communication, wherein the first RRC Reconfiguration message indicates a relay UE for the path switching, (v) to receive the L2ID of the remote UE from the relay UE, (vi) to transmit a local UE ID for the remote UE and the L2ID or a destination index of the remote UE to the relay UE, and (vii) to receive a first RRC Reconfiguration Complete message corresponding to the first RRC Reconfiguration message from the remote UE via the relay UE, wherein the first RRC Reconfiguration Complete message is received with the local UE ID for the remote UE. Furthermore, the CPU 308 can execute the program code 312 to perform all of the above-described actions and steps or others described herein.

Figure 26:
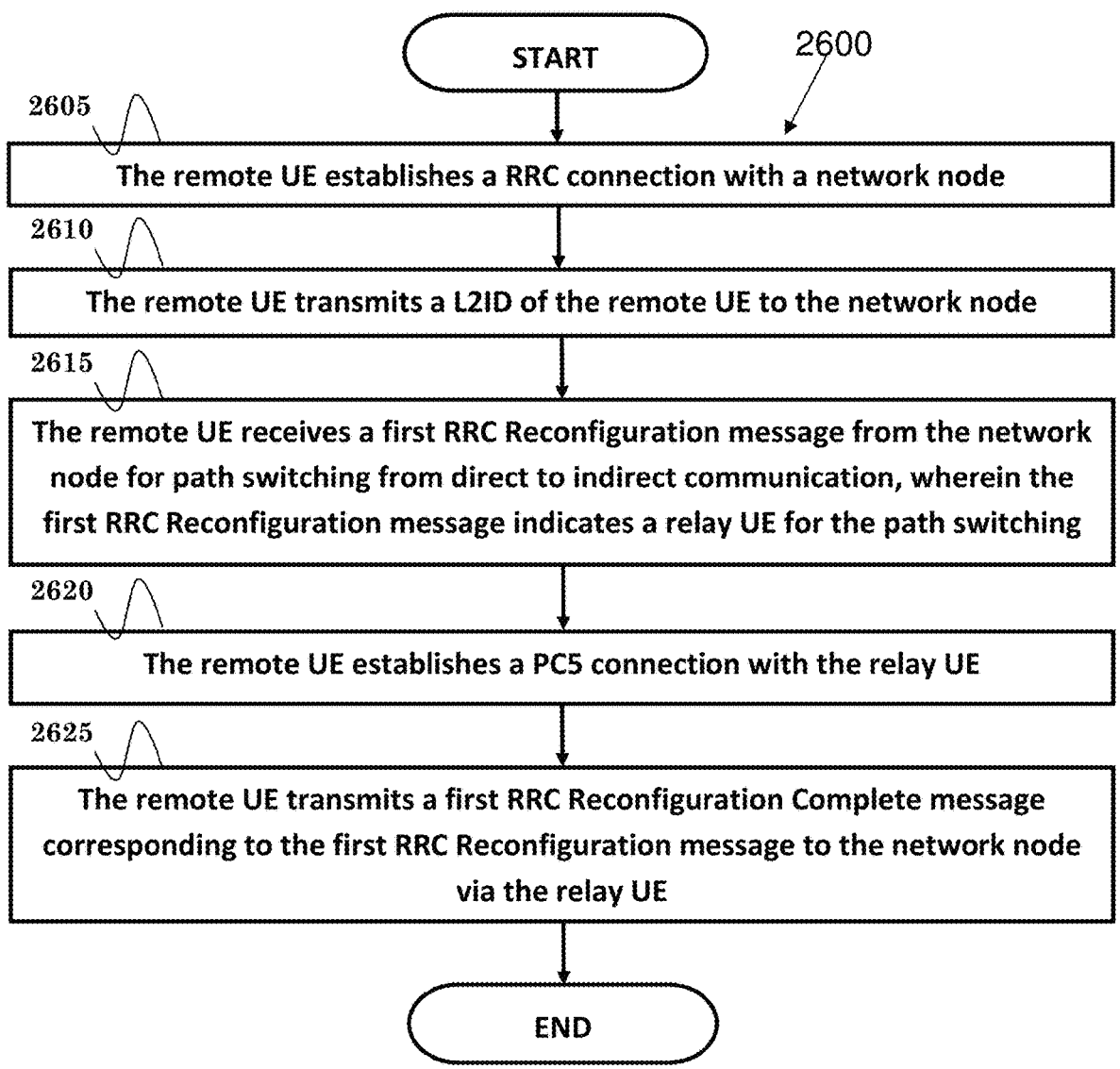
FIG. 26 is a flow chart according to one exemplary embodiment.

In the context of Method 1-3 and Method 1-4 discussed above, FIG. 26 is a flow chart 2600 from the perspective of a remote UE. In step 2605, the remote UE establishes a RRC connection with a network node. In step 2610, the remote UE transmits a L2ID of the remote UE to the network node. In step 2615, the remote UE receives a first RRC Reconfiguration message from the network node for path switching from direct to indirect communication, wherein the first RRC Reconfiguration message indicates a relay UE for the path switching. In step 2620, the remote UE establishes a PC5 connection with the relay UE. In step 2625, the remote UE transmits a first RRC Reconfiguration Complete message corresponding to the first RRC Reconfiguration message to the network node via the relay UE.

In one embodiment, the remote UE could transmit a measurement report to the network node, wherein the measurement report indicates one or more candidate relay UEs containing the relay UE, and wherein the measurement report includes a L2ID of the relay UE. The first RRC Reconfiguration message could include a L2ID of the relay UE.

In one embodiment, the remote UE could transmit a first PC5-S message (e.g. Direct Communication Request) to the relay UE for request of establishment of a layer-2 link between the remote UE and the relay UE, wherein the first PC5-S message is transmitted with the L2ID of the remote UE as Source Layer-2 ID and the L2ID of the relay UE as Destination Layer-2 ID. The remote UE could receive a second PC5-S message (e.g. Direct Communication Accept) from the relay UE for completing the establishment of the layer-2 link, wherein the second PC5-S message is received with the L2ID of the relay UE as Source Layer-2 ID and the L2ID of the remote UE as Destination Layer-2 ID. The first PC5-S message could be a Direct Communication Request and the second PC5-S message is a Direct Communication Accept.

In one embodiment, the first RRC Reconfiguration message could include a Uu SRB configuration and/or a PC5 (or SL) RLC channel configuration for forwarding the first RRC Reconfiguration Complete message to the network node via the relay UE. The first RRC Reconfiguration Complete message forwarded from the relay UE to the network node could be included in an adaptation layer PDU and a local UE ID for the remote UE is included in a header of the adaptation layer PDU.

In one embodiment, the L2ID of the remote UE could be transmitted to the network node via a SidelinkUEInformationNR message. The L2ID of the remote UE could be provided to the relay UE by the network node for the relay UE to associate a local UE ID of the remote UE with the remote UE for path switching from direct to indirect communication.

In one embodiment, the network node could be a base station (e.g. gNB). The measurement report could include the L2ID of the relay UE.

Referring back to FIGS. 3 and 4, in one exemplary embodiment of a method for a remote UE, the remote UE 300 includes a program code 312 stored in the memory 310. The CPU 308 could execute program code 312 to enable the remote UE (i) to establish a RRC connection with a network node, (ii) to transmit a L2ID of the remote UE to the network node, (iii) to receive a first RRC Reconfiguration message from the network node for path switching from direct to indirect communication, wherein the first RRC Reconfiguration message indicates a relay UE for the path switching, (iv) to establish a PC5 connection with the relay UE, and (v) to transmit a first RRC Reconfiguration Complete message corresponding to the first RRC Reconfiguration message to the network node via the relay UE. Furthermore, the CPU 308 can execute the program code 312 to perform all of the above-described actions and steps or others described herein.

Figure 27:
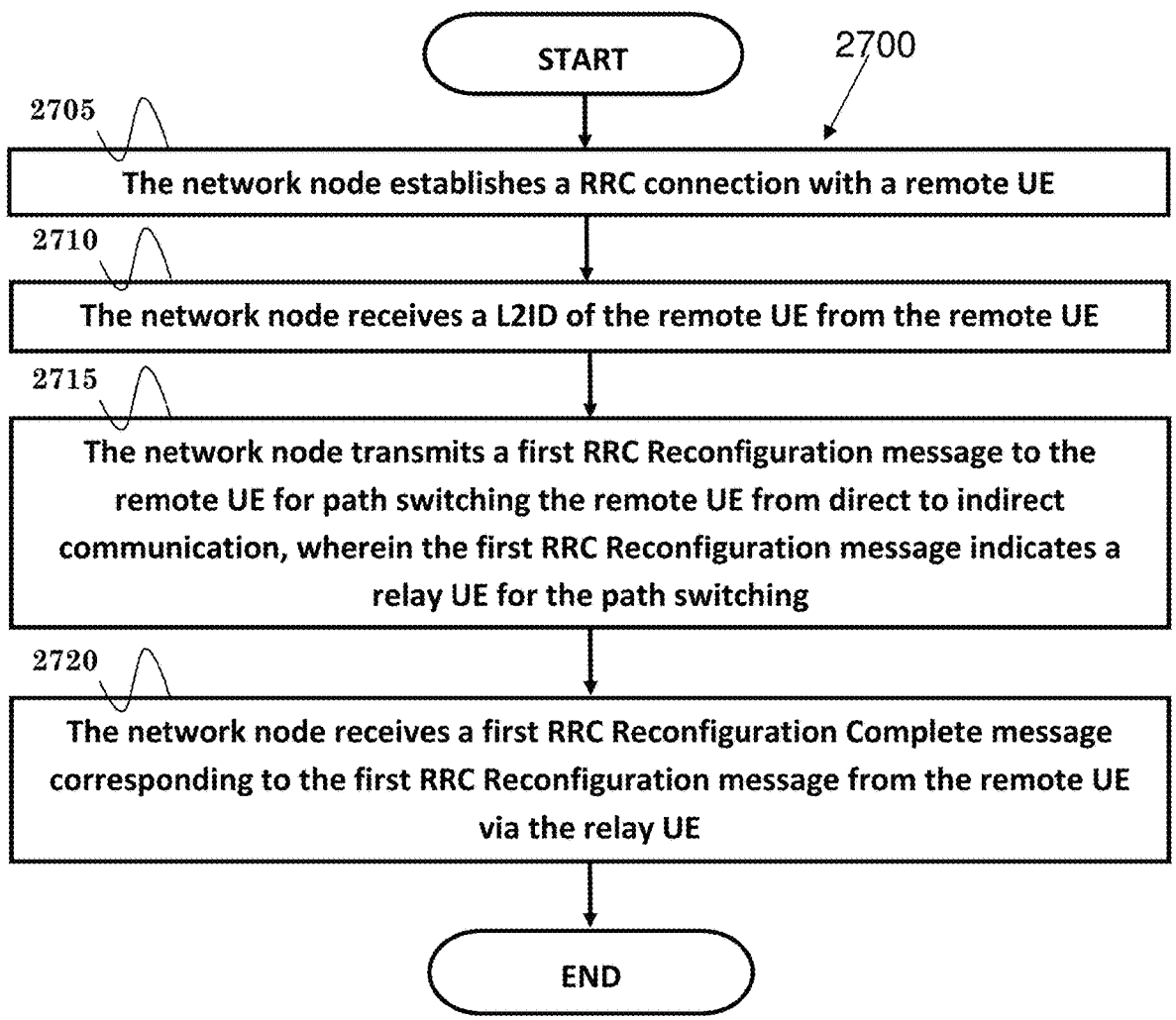
FIG. 27 is a flow chart according to one exemplary embodiment.

In the context of Method 1-3 and Method 1-4 discussed above, FIG. 27 is a flow chart 2700 from the perspective of a network node. In step 2705, the network node establishes a RRC connection with a remote UE. In step 2710, the network node receives a L2ID of the remote UE from the remote UE. In step 2715, the network node transmits a first RRC Reconfiguration message to the remote UE for path switching the remote UE from direct to indirect communication, wherein the first RRC Reconfiguration message indicates a relay UE for the path switching. In step 2720, the network node receives a first RRC Reconfiguration Complete message corresponding to the first RRC Reconfiguration message from the remote UE via the relay UE.

In one embodiment, the network node could receive a measurement report from the remote UE, wherein the measurement report indicates one or more candidate relay UEs containing the relay UE, and wherein the measurement report includes a L2ID of the relay UE. The first RRC Reconfiguration message includes a Uu Signaling Radio Bearer (SRB) configuration and/or a PC5 (or Sidelink (SL)) Radio Link Control (RLC) channel configuration for forwarding the first RRC Reconfiguration Complete message to the network node via the relay UE, and wherein the first RRC Reconfiguration includes the L2ID of the relay UE. The network node could receive the L2ID of the relay UE from the relay UE. The L2ID of the relay UE could be received from the relay UE via a second SidelinkUEInformationNR message.

In one embodiment, the first RRC Reconfiguration Complete message forwarded from the relay UE to the network node could be included in an adaptation layer PDU and a local UE ID for the remote UE is included in a header of the adaptation layer PDU. The network node could transmit a second RRC Reconfiguration message to the relay UE, wherein the second RRC Reconfiguration message includes the L2ID of the remote UE and the local UE ID for the remote UE.

In one embodiment, the L2ID of the remote UE could be received from the remote UE via a first SidelinkUEInformationNR message.

Referring back to FIGS. 3 and 4, in one exemplary embodiment of a method for a network node, the network node 300 includes a program code 312 stored in the memory 310. The CPU 308 could execute program code 312 to enable the network node (i) to establish a RRC connection with a remote UE, (ii) to receive a L2ID of the remote UE from the remote UE, (iii) to transmit a first RRC Reconfiguration message to the remote UE for path switching the remote UE from direct to indirect communication, wherein the first RRC Reconfiguration message indicates a relay UE for the path switching, and (iv) to receive a first RRC Reconfiguration Complete message corresponding to the first RRC Reconfiguration message from the remote UE via the relay UE. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a remote User Equipment (UE), comprising:
   the remote UE establishes a Radio Resource Control (RRC) connection with a network node;
   the remote UE transmits a Layer 2 Identity (L2ID) of the remote UE to the network node;
   the remote UE receives a first RRC Reconfiguration message from the network node for path switching from direct to indirect communication, wherein the first RRC Reconfiguration message includes a L2ID of a relay UE for the path switching;
   the remote UE establishes a PC5 connection with the relay UE; and
   the remote UE transmits a first RRC Reconfiguration Complete message corresponding to the first RRC Reconfiguration message to the network node via the relay UE after establishing the PC5 connection with the relay UE,
   wherein the first RRC Reconfiguration Complete message forwarded from the relay UE to the network node is included in an adaptation layer Protocol Data Unit (PDU) and a local UE Identity (ID) for the remote UE is included in a header of the adaptation layer PDU.

2. The method of claim 1, further comprising: the remote UE transmits a measurement report to the network node, wherein the measurement report indicates one or more candidate relay UEs containing the relay UE, and wherein the measurement report includes the L2ID of the relay UE.

3. The method of claim 1, wherein the first RRC Reconfiguration message includes a Uu Signaling Radio Bearer (SRB) configuration and/or a PC5 (or Sidelink (SL)) Radio Link Control (RLC) channel configuration for forwarding the first RRC Reconfiguration Complete message to the network node via the relay UE.

4. The method of claim 1, wherein the L2ID of the remote UE is transmitted to the network node via a SidelinkUEInformationNR (SidelinkUserEquipmentInformationNewRAT/Radio) message.

5. A remote UE (User Equipment), comprising:
a control circuit;
a processor installed in the control circuit; and
a memory installed in the control circuit and operatively coupled to the processor;
wherein the processor is configured to execute a program code stored in the memory to:
establish a Radio Resource Control (RRC) connection with a network node;
transmit a Layer 2 Identity (L2ID) of the remote UE to the network node;
receive a first RRC Reconfiguration message from the network node for path switching from direct to indirect communication, wherein the first RRC Reconfiguration message includes a L2ID of a relay UE for the path switching;
establish a PC5 connection with the relay UE; and
transmit a first RRC Reconfiguration Complete message corresponding to the first RRC Reconfiguration message to the network node via the relay UE after establishing the PC5 connection with the relay UE, wherein the first RRC Reconfiguration Complete message forwarded from the relay UE to the network node is included in an adaptation layer Protocol Data Unit (PDU) and a local UE Identity (ID) for the remote UE is included in a header of the adaptation layer PDU.

6. The remote UE of claim 5, wherein the processor is further configured to execute a program code stored in the memory to:
transmit a measurement report to the network node, wherein the measurement report indicates one or more candidate relay UEs containing the relay UE, and wherein the measurement report includes the L2ID of the relay UE.

7. The remote UE of claim 5, wherein the first RRC Reconfiguration message includes a Uu Signaling Radio Bearer (SRB) configuration and/or a PC5 (or Sidelink (SL)) Radio Link Control (RLC) channel configuration for forwarding the first RRC Reconfiguration Complete message to the network node via the relay UE.

8. The remote UE of claim 5, wherein the L2ID of the remote UE is transmitted to the network node via a SidelinkUEInformationNR (SidelinkUserEquipmentInformationNewRAT/Radio) message.

9. A method for a network node, comprising:
the network node establishes a Radio Resource Control (RRC) connection with a remote User Equipment (UE);
the network node receives a Layer 2 Identity (L2ID) of the remote UE from the remote UE;
the network node transmits a first RRC Reconfiguration message to the remote UE for path switching the remote UE from direct to indirect communication, wherein the first RRC Reconfiguration message includes a L2ID of a relay UE for the path switching; and
the network node receives a first RRC Reconfiguration Complete message corresponding to the first RRC Reconfiguration message from the remote UE via the relay UE,
wherein the first RRC Reconfiguration Complete message forwarded from the relay UE to the network node is included in an adaptation layer Protocol Data Unit (PDU) and a local UE Identity (ID) for the remote UE is included in a header of the adaptation layer PDU.

10. The method of claim 9, further comprising:
the network node receives a measurement report from the remote UE, wherein the measurement report indicates one or more candidate relay UEs containing the relay UE, and wherein the measurement report includes the L2ID of the relay UE.

11. The method of claim 10, wherein the first RRC Reconfiguration message includes a Uu Signaling Radio Bearer (SRB) configuration and/or a PC5 (or Sidelink (SL)) Radio Link Control (RLC) channel configuration for forwarding the first RRC Reconfiguration Complete message to the network node via the relay UE, and wherein the first RRC Reconfiguration includes the L2ID of the relay UE.

12. The method of claim 10, further comprising:
the network node receives the L2ID of the relay UE from the relay UE.

13. The method of claim 12, wherein the L2ID of the relay UE is received from the relay UE via a second SidelinkUEInformationNR (SidelinkUserEquipmentInformationNewRAT/Radio) message.

14. The method of claim 9, further comprising:
the network node transmits a second RRC Reconfiguration message to the relay UE, wherein the second RRC Reconfiguration message includes the L2ID of the remote UE and the local UE ID for the remote UE.

15. The method of claim 9, wherein the L2ID of the remote UE is received from the remote UE via a first SidelinkUEInformationNR (SidelinkUserEquipmentInformationNewRAT/Radio) message.

* * * * *